(12) United States Patent
Okamoto et al.

(10) Patent No.: US 9,032,150 B2
(45) Date of Patent: May 12, 2015

(54) STORAGE APPARATUS AND CONTROL METHOD OF STORAGE APPARATUS

(75) Inventors: Homare Okamoto, Odawara (JP); Mitsuhide Sato, Oiso (JP)

(73) Assignee: Hitachi, Ltd., Tokyo (JP)

( * ) Notice: Subject to any disclaimer, the term of this patent is extended or adjusted under 35 U.S.C. 154(b) by 917 days.

(21) Appl. No.: 12/936,737

(22) PCT Filed: Sep. 17, 2010

(86) PCT No.: PCT/JP2010/005692
§ 371 (c)(1),
(2), (4) Date: Aug. 22, 2011

(87) PCT Pub. No.: WO2012/035589
PCT Pub. Date: Mar. 22, 2012

(65) Prior Publication Data
US 2012/0072642 A1    Mar. 22, 2012

(51) Int. Cl.
*G06F 12/06* (2006.01)
*G06F 3/06* (2006.01)

(52) U.S. Cl.
CPC ............ *G06F 3/0632* (2013.01); *G06F 3/0607* (2013.01); *G06F 3/0679* (2013.01); *G06F 3/0689* (2013.01)

(58) Field of Classification Search
CPC .................................................. G06F 13/4081
See application file for complete search history.

(56) References Cited

U.S. PATENT DOCUMENTS

| 5,621,685 | A  |   | 4/1997 | Cernea et al. |
| 6,052,306 | A  | * | 4/2000 | Sedlak et al. ............ 365/185.19 |
| 6,252,791 | B1 |   | 6/2001 | Wallace et al. |
| 2004/0162940 | A1 |   | 8/2004 | Yagisawa et al. |
| 2010/0049902 | A1 |   | 2/2010 | Kakihara et al. |

FOREIGN PATENT DOCUMENTS

JP    2010-049502    4/2010

OTHER PUBLICATIONS

PCT International Search Report and Written Opinion on application No. PCT/JP2010/005692 dated May 23, 2011; 11 pages.

* cited by examiner

*Primary Examiner* — Charles Rones
*Assistant Examiner* — Ryan Dare
(74) *Attorney, Agent, or Firm* — Foley & Lardner LLP

(57) ABSTRACT

Storage drives of a plurality of types are mounted on a storage device together. A storage apparatus includes: an I/O controller that receives an access request sent from an information apparatus and writes data to or reads data from a storage drive; a storage drive mounting unit in which the storage drive is detachably mounted; a drive power supplying unit that supplies drive power to the storage drive mounted in the storage drive mounting unit; and a drive voltage identifying unit that identifies a voltage allowing data write to or data read from the storage drive mounted in the storage drive mounting unit, by raising a drive voltage applied to the storage drive from a voltage below a rated drive voltage of the storage drive. When the I/O controller writes data to or reads data from the storage drive, the drive power supplying unit applies the identified voltage to the storage drive to drive the storage drive.

8 Claims, 26 Drawing Sheets

Fig. 14

MOUNTABLE MEMORY MANAGEMENT TABLE 450

| No | MEMORY TYPE | INTERFACE | OPERATING VOLTAGE | NUMBER OF WRITABLE TIMES | ACCESS TIME |
|---|---|---|---|---|---|
| 1 | MRAM | SRAM | 5V | $10^{16}$ | 30ns |
| 2 | FeRAM | DDR2 | 1.8V | $10^{12}$ | 50ns |
| 3 | MRAM | SRAM | 3V | $10^{16}$ | 30ns |
| 4 | PRAM | DRAM | 3V | $10^{12}$ | 10ns |
| 5 | PRAM | DDR3 | 1.5V | $10^{12}$ | 10ns |
| 6 | | | | | |
| 7 | | | | | |
| 8 | | | | | |

Fig. 15

DRIVE MANAGEMENT TABLE 400

| DRIVE ID | APPARATUS ID | DRIVE TYPE | STORAGE CAPACITY | OPERATING VOLTAGE | NUMBER OF WRITABLE TIMES | INTERFACE | ACCESS TIME | RGID | REAL LUID | NUMBER OF WRITE TIMES |
|---|---|---|---|---|---|---|---|---|---|---|
| 0 | 1 | FeRAM | 100GB | 1.8V | $10^{12}$ | DDR2 | 50ns | 0 | 0,1 | $10^6$ |
| 1 | 1 | FeRAM | 100GB | 1.8V | $10^{12}$ | DDR2 | 50ns | 0 | 0,1 | $10^6$ |
| 2 | 1 | MRAM | 50GB | 3V | $10^{16}$ | SRAM | 30ns | 1 | 2,3,4 | $10^9$ |
| 3 | 1 | MRAM | 50GB | 3V | $10^{16}$ | SRAM | 30ns | 1 | 2,3,4 | $10^9$ |
| 4 | 1 | PRAM | 200GB | 1.5V | $10^{13}$ | DDR3 | 10ns | 1 | 2,3,4 | $10^9$ |
| 5 | 1 | PRAM | 200GB | 1.5V | $10^{13}$ | DDR3 | 10ns | 1 | 2,3,4 | $10^9$ |
| 6 | 1 | PRAM | 200GB | 1.5V | $10^{13}$ | DDR3 | 10ns | 1 | 2,3,4 | $10^9$ |
| 7 | 1 | MRAM | 50GB | 3V | $10^{16}$ | SRAM | 10ns | 2 | 5 | 0 |
| 8 | 1 | MRAM | 50GB | 3V | $10^{16}$ | SRAM | 10ns | 2 | 5 | 0 |
| 9 | 1 | MRAM | 50GB | 3V | $10^{16}$ | SRAM | 10ns | 2 | 5 | 0 |
| 10 | 1 | MRAM | 50GB | 3V | $10^{16}$ | SRAM | 10ns | 2 | 5 | 0 |
| ... | | | | | | | | | | |

Fig. 16

RAID GROUP MANAGEMENT TABLE 410

| RGID | STORAGE CAPACITY | ACCESS TIME | REAL LUID | NUMBER OF WRITABLE TIMES | RAID LEVEL | USED CAPACITY | NUMBER OF WRITE TIMES |
|---|---|---|---|---|---|---|---|
| 0 | 200GB | 50ns | 0,1 | $10^{12}$ | RAID1 | 150GB | $10^6$ |
| 1 | 700GB | 30ns | 2,3,4 | $10^{13}$ | RAID5 | 300GB | $10^9$ |
| 2 | 200GB | 10ns | 5 | $10^{16}$ | RAID5 | 100GB | 0 |

Fig. 17

LU MANAGEMENT TABLE 420

| REAL LUID | STORAGE CAPACITY | RGID | ACCESS TIME | NUMBER OF WRITE TIMES | ALLOCATION DESTINATION |
|---|---|---|---|---|---|
| 0 | 50GB | 0 | 50ns | $10^5$ | POOL 0 |
| 1 | 100GB | 0 | 50ns | $9 \times 10^5$ | POOL 0 |
| 2 | 100GB | 1 | 30ns | $2 \times 10^8$ | POOL 1 |
| 3 | 100GB | 1 | 30ns | $3 \times 10^8$ | POOL 1 |
| 4 | 100GB | 1 | 30ns | $5 \times 10^8$ | POOL 1 |
| 5 | 100GB | 2 | 10ns | 0 | POOL 1 |

Fig. 18

POOL MANAGEMENT TABLE (430)

| POOL ID | STORAGE CAPACITY | USED CAPACITY | ALLOCATION DESTINATION | VIRTUAL LUID |
|---|---|---|---|---|
| 0 | 150GB | 120GB | Host0 | 10 |
| 1 | 300GB | 100GB | Host1 | 20,30,40 |

Fig. 19

ACCESS FREQUENCY MANAGEMENT TABLE (440)

| VIRTUAL LUID | DATA ACCESS FREQUENCY |
|---|---|
| 10 | $10^3$ |
| 20 | $10^3$ |
| 30 | $10^3$ |
| 40 | $10^6$ |
| ⋮ | ⋮ |

STORAGE APPARATUS AND CONTROL METHOD OF STORAGE APPARATUS

TECHNICAL FIELD

The present invention relates to a storage apparatus and a control method of the storage apparatus.

BACKGROUND ART

Recently, a SSD (Solid State Drive) mounted with a large-capacity flash memory has been put to practical use.

A technique has been developed for a storage apparatus mounted with a HDD (Hard Disk Drive) mixed with a SSD different in write performance of write data from a cache memory. With this technique, an SSD achieving inferior write performance is provided with a cache memory separately from a cache memory for the HDD (refer to PTL 1, for example).

CITATION LIST

Patent Literature

PTL 1: Japanese Patent Application Publication No. 2010-049502

SUMMARY OF INVENTION

Technical Problem

In addition to the flash memory, various nonvolatile semiconductor memories such as PRAM (Phase Change RAM), FeRAM (Ferroelectric RAM), and MRAM (Magnetoresistive RAM) have been developed recently. Consequently, practical use of storage drives mounted with these semiconductor memories is expected to be promoted in the future. In such case, a storage system is required to be capable of being mounted with such storage drives mixed together.

However, since access methods of the semiconductor memories vary depending on their types, it is difficult for a storage system to access storage drives mounted with such semiconductor memories by a unified access method.

The present invention has been made in view of such a background, an object of the present invention is to provide a storage apparatus capable of being mounted with a plurality of types of storage drives together and a method for controlling the storage apparatus.

Solution to Problem

One of storage apparatuses for achieving the above object is a storage apparatus including: an I/O controller which receives an access request sent from an information apparatus communicatively coupled thereto and writes data to or reads data from a storage drive in response to the access request; a storage drive mounting unit in which the storage drive is detachably mounted; a drive power supplying unit that supplies drive power to the storage drive mounted in the storage drive mounting unit; and a drive voltage identifying unit which identifies a voltage allowing data write to or data read from the storage drive by raising a drive voltage applied to the storage drive mounted in the storage drive mounting unit from a voltage not higher than a rated drive voltage of the storage drive, wherein when the I/O controller writes data to or reads data from the storage drive, the drive power supplying unit applies the identified voltage to the storage drive to drive the storage drive.

Further, problems and solutions thereto disclosed in the present application will be made apparent from the description of embodiments and the accompanying drawings.

Advantageous Effects of Invention

The present invention can provide a storage apparatus capable of being mounted with a plurality of types of storage drives together and a method for controlling the storage apparatus.

BRIEF DESCRIPTION OF DRAWINGS

FIG. 14 is a diagram showing a mountable memory management table according to the present embodiment.

FIG. 15 is a diagram showing a drive management table according to the present embodiment.

FIG. 16 is a diagram showing a RAID group management table according to the present embodiment.

FIG. 17 is a diagram showing a LU management table according to the present embodiment.

FIG. 18 is a diagram showing a pool management table according to the present embodiment.

FIG. 19 is a diagram showing an access frequency management table according to the present embodiment.

DESCRIPTION OF EMBODIMENTS

Hereinafter, an embodiment according to the present invention will be described with reference to the accompanying drawings.

Entire Configuration

Figure 1:
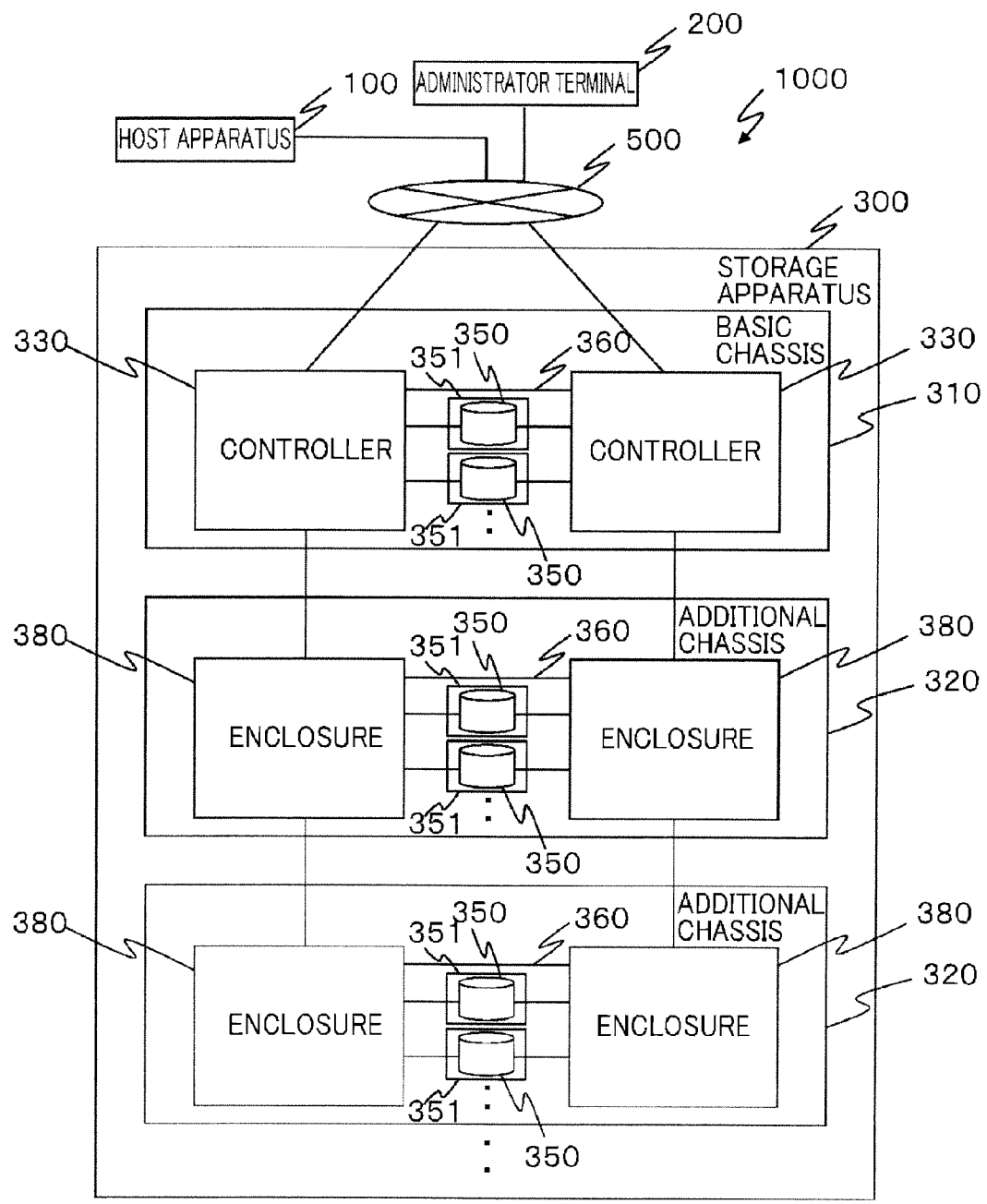
FIG. 1 is a diagram showing a configuration of a storage system according to an embodiment of the present invention.

FIG. 1 shows a schematic configuration of a storage system 1000 according to the present embodiment. As shown in FIG. 1, the storage system 1000 includes a storage apparatus 300, at least one host apparatus 100 communicatively coupled to the storage apparatus 300 through a communication network 500 and an administrator terminal 200.

The communication network 500 is, for example, a LAN (Local Area Network), a SAN (Storage Area Network), the Internet, a public communication network, or the like. Communication between the host apparatus 100 and the storage apparatus 300 is carried out using a protocol such as TCP/IP, iSCSI (internet Small Computer System Interface), Fibre Channel Protocol, FICON (Fibre Connection) (registered trademark), ESCON (Enterprise System Connection) (registered trademark), ACONARC (Advanced Connection Architecture) (registered trademark), or FIBARC (Fibre Connection Architecture) (registered trademark), for example.

The host apparatus 100 is an information apparatus (computer) that uses a storage area provided by the storage apparatus 300 as a storage location for data. For example, the host apparatus 100 is a personal computer, a mainframe computer, an office computer, or the like. To gain access to the storage area, the host apparatus 100 sends a data input/output request (hereinafter referred as a data I/O request) to the storage apparatus 300.

An administrator terminal 200 is a computer used for maintenance and management of the storage apparatus 300. By operating the administrator terminal 200, an operator can modify RAID (modification from RAID1 to RAID5 and the like, for example) including a plurality of storage drives 350 in the storage apparatus 300, and increase or decrease the number of the storage drives 350, for example. Such settings and controls can be performed via a user interface included in the administrator terminal 200.

The storage apparatus 300 includes a basic chassis 310 and at least one additional chassis 320 that are cascade-coupled to the basic chassis 310. Among these, the basic chassis 310 includes two controllers 330 and at least one storage drive 350 that is communicatively coupled to the controllers 330. The controllers 330 are communicatively coupled to each other through a communication line 360 such as a bus.

The controllers 330 and the storage drives 350 are unitized, and are attached to and detached from the basic chassis 310 by being inserted into and withdrawn from mounting slots (storage drive mounting units) 351 provided to the basic chassis 310. Although not shown, the basic chassis 310 has various other devices including a cooling device (such as a cooling fan) for cooling heat-generating components such as the storage drives 350, and a power supply device for driving the controllers 330, the storage drives 350, the cooling device and the like.

The additional chassis 320 includes two enclosures 380 and at least one storage drive 350 that is communicatively coupled to the enclosures 380. The enclosures 380 are coupled to each other through a communication line 360 such as a bus. The enclosures 380 and the storage drives 350 are unitized, and are attached to and detached from the additional chassis 320 by being inserted into and withdrawn from mounting slots (storage drive mounting units) 351 provided to the additional chassis 320. Although not shown, the additional chassis 320 has various other devices including a cooling device (such as a cooling fan) for cooling heat-generating components such as the storage drives 350, and a power supply device for driving the storage drives 350, the cooling device and the like.

The storage drive 350 is a device including a nonvolatile storage medium to record data. There are many types of the storage drive 350, including, for example, hard disk drives such as SAS (Serial Attached SCSI), SATA (Serial ATA), FC (Fibre Channel), PATA (Parallel ATA), and SCSI (Small Computer System Interface), and semiconductor memory devices (SSD) internally mounted with semiconductor memories such as a flash memory, PRAM, MRAM, and FeRAM.

Although described in detail later, the storage apparatus 300 according to the present embodiment includes expanders 338 in the controllers 330 and the enclosures 380, and each expander 338 is mounted with an I/F processor 750. This allows the storage apparatus 300 to be mounted with many types of the storage drives 350 together.

Here, PRAM is a nonvolatile memory which stores data by using a phase-change film that changes between a crystal phase and an amorphous phase. MRAM is a non-volatile memory which stores data by changing magnetization direction of a magneto-resistance element. FeRAM is a nonvolatile memory which stores data by changing the self-polarization of a ferroelectric.

Host Apparatus and Administrator Terminal

Figure 2:
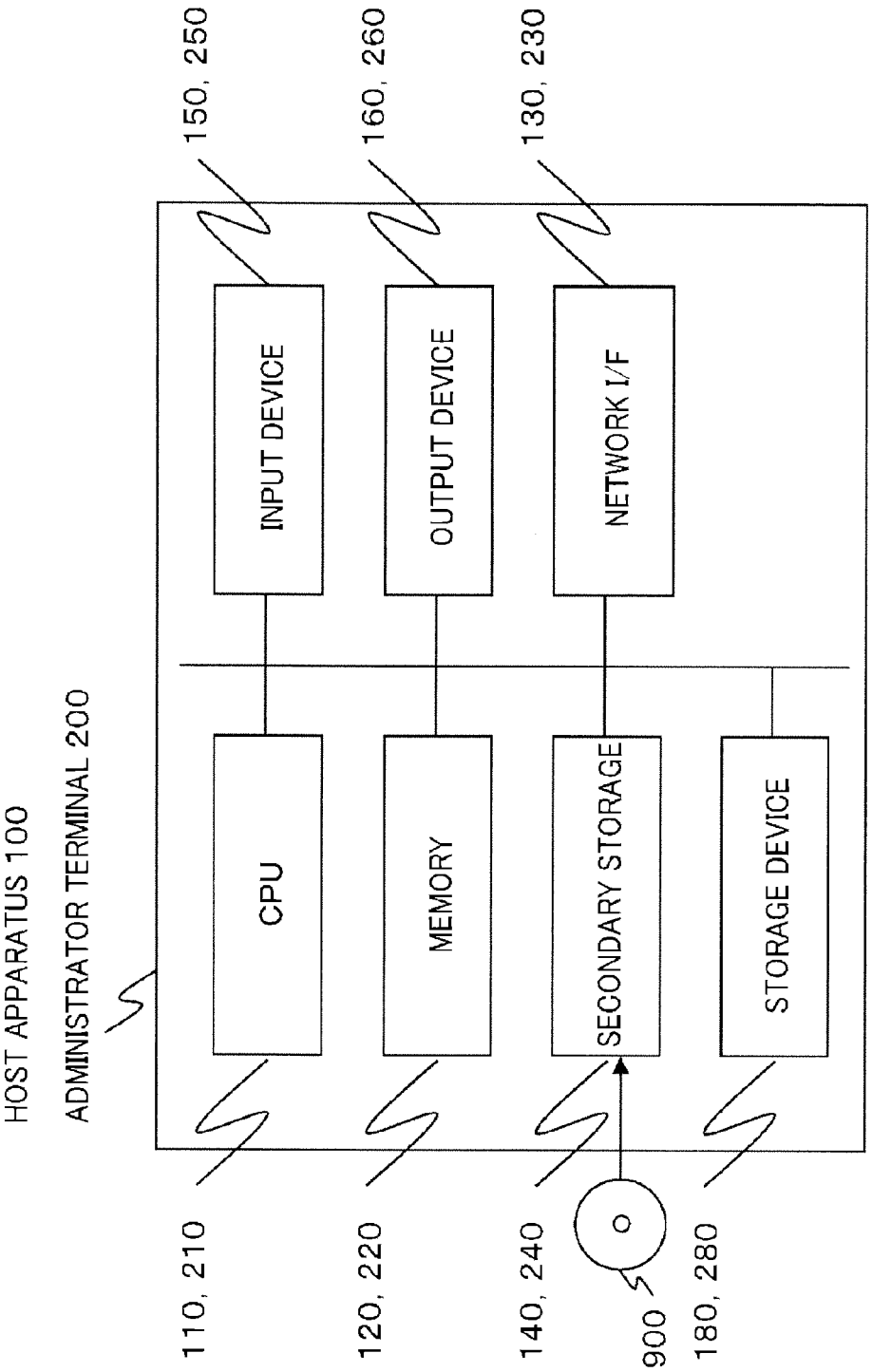
FIG. 2 is a diagram showing a configuration of a host apparatus and an administrator terminal according to the present embodiment.

FIG. 2 shows an example of hardware of an information apparatus used as the host apparatus 100 or the administrator terminal 200.

As shown in FIG. 2, the host apparatus 100 includes a CPU 110, a volatile or non-volatile memory 120 (RAM or ROM), a secondary storage 140 which reads and writes data from and to a storage medium 900 such as a flexible disk, CD, DVD, or optical disk and the like, a storage device 180 (for example, HDD and semiconductor memory device (SSD)), an input device 150 such as a keyboard and mouse, an output device 160 such as a liquid crystal monitor and printer, and a network interface (hereinafter, referred to as network I/F 130) such as NIC (Network Interface Card) and HBA (Host Bus Adapter).

The administrator terminal 200 includes a CPU 210, a volatile or nonvolatile memory 220 (RAM or ROM), a secondary storage 240 which reads and writes data from and to a storage medium 900 such as a flexible disk, CD, DVD, or optical disk and the like, a storage device 280 (for example, HDD and semiconductor memory device (SSD)), an input device 250 such as a keyboard and mouse, an output device 260 such as a liquid crystal monitor and printer, and network interface (hereinafter, referred to as network I/F 230) such as NIC and HBA.

The host apparatus 100 is a computer which provides services such as an automated banking service and Internet web page browsing service. The storage apparatus 300 provides data storage areas to application programs and the like executed by the host apparatus 100.

The administrator terminal 200 receives input of various setting information to set the storage apparatus 300, such as increase or decrease of storage volumes 350, and various RAID-related settings and modifications. The administrator terminal 200 also sends such setting information to the storage apparatus 300. Further, the administrator terminal 200 receives, from the storage apparatus 300, and displays various information such as setting information and failure occurrence status of the storage apparatus 300.

Storage Apparatus

Figure 3:
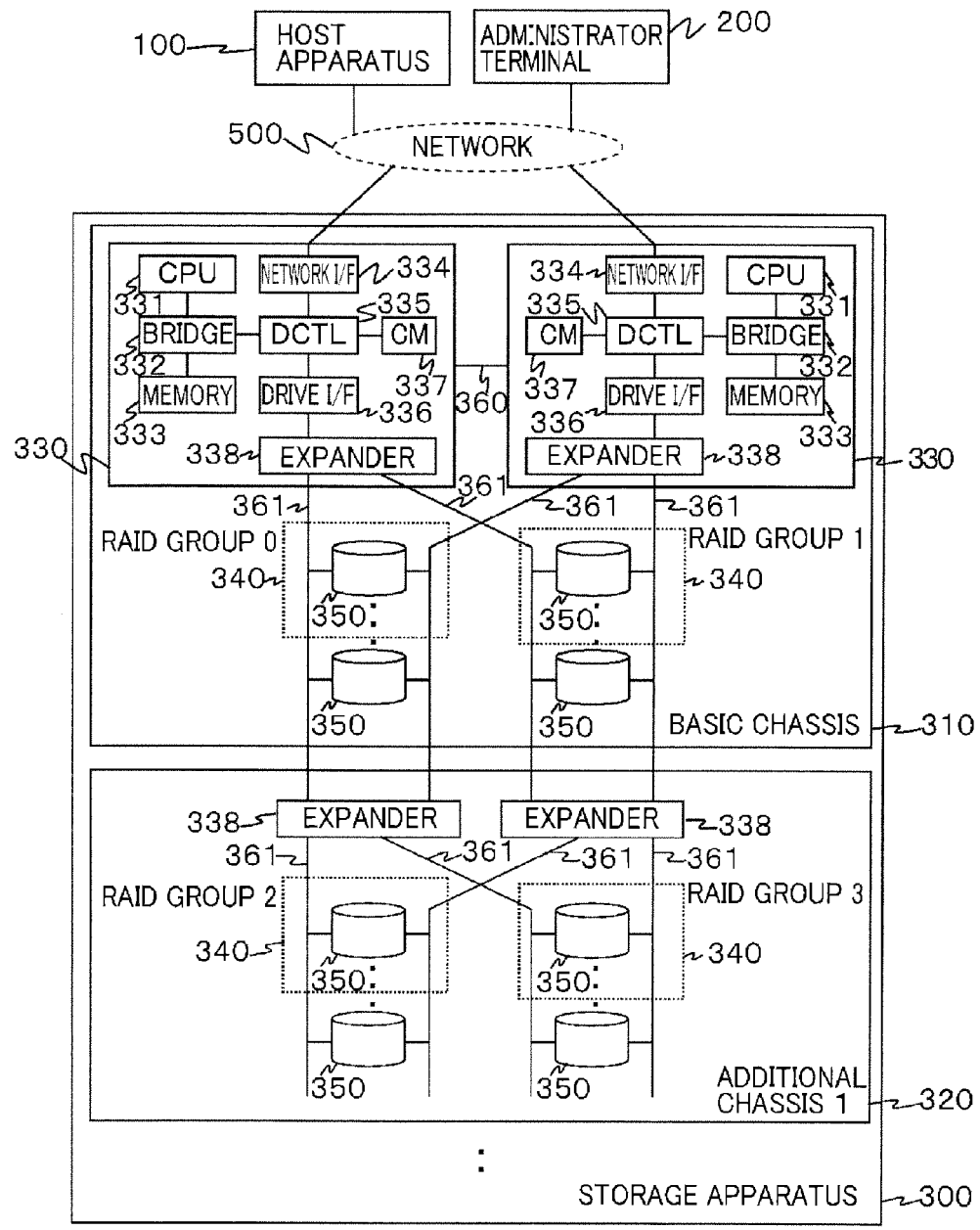
FIG. 3 is a diagram showing a configuration of a storage apparatus according to the present embodiment.

FIG. 3 shows a hardware configuration of the storage apparatus 300. As shown in FIG. 3, the storage apparatus 300 includes basic chassis 310 on which there are mounted the plurality of controllers 330 made redundant for reliability improvement and load balancing, and additional chassis 320 having no controllers 330.

<Basic Chassis>

The basic chassis 310 includes controllers 330 and storage drives 350.

The controller 330 includes a network I/F 334, a data controller (DCTL) 335, a drive I/F 336, a cache memory (CM) 337, a bridge 332, a CPU (Central Processing Unit) 331, a memory 333, and an expander 338. The controllers 330 of a redundant configuration are communicatively coupled to each other via an internal bus 360 conforming to a standard such as PCI Express (PCI: Peripheral Component Interconnect).

The storage drive 350 is a hard disk drive conforming to a standard such as SAS (Serial Attached SCSI), SATA (Serial ATA), FC (Fibre Channel), PATA (Parallel ATA), or SCSI (Small Computer System Interface), or a semiconductor memory device (SSD: solid state drive) internally mounted with a semiconductor memory such as a flash memory, PRAM, MRAM, or FeRAM.

The storage drive 350 is coupled to the controllers 330 via serial links 361 specified by the SAS Standard.

A RAID group 340 includes a plurality of the storage drives 350.

In each of the RAID groups 340, a logical volume (hereinafter, also referred to as a LU (Logical Unit)) is formed. The storage apparatus 300 provides the host apparatus 100 with the logical volume. The host apparatus 100 uses the logical volume as a storage area. An identifier identifying each logical volume is also referred to as a LUN (Logical Unit Number). A LUN is set, for example, in a data input/output request sent from the host apparatus 100 to the storage apparatus 300.

<Additional Chassis>

The additional chassis 320 includes expanders 338 and storage drives 350.

Each of the storage drives 350 included in the additional chassis 320 is coupled to the controllers 330 via serial links 361 together with the storage drives 350 included in the basic chassis 310.

The expanders 338 included in the additional chassis 320 couples the serial links 361 of the basic chassis 310 with the serial links 361 of the additional chassis 320.

Figure 4:
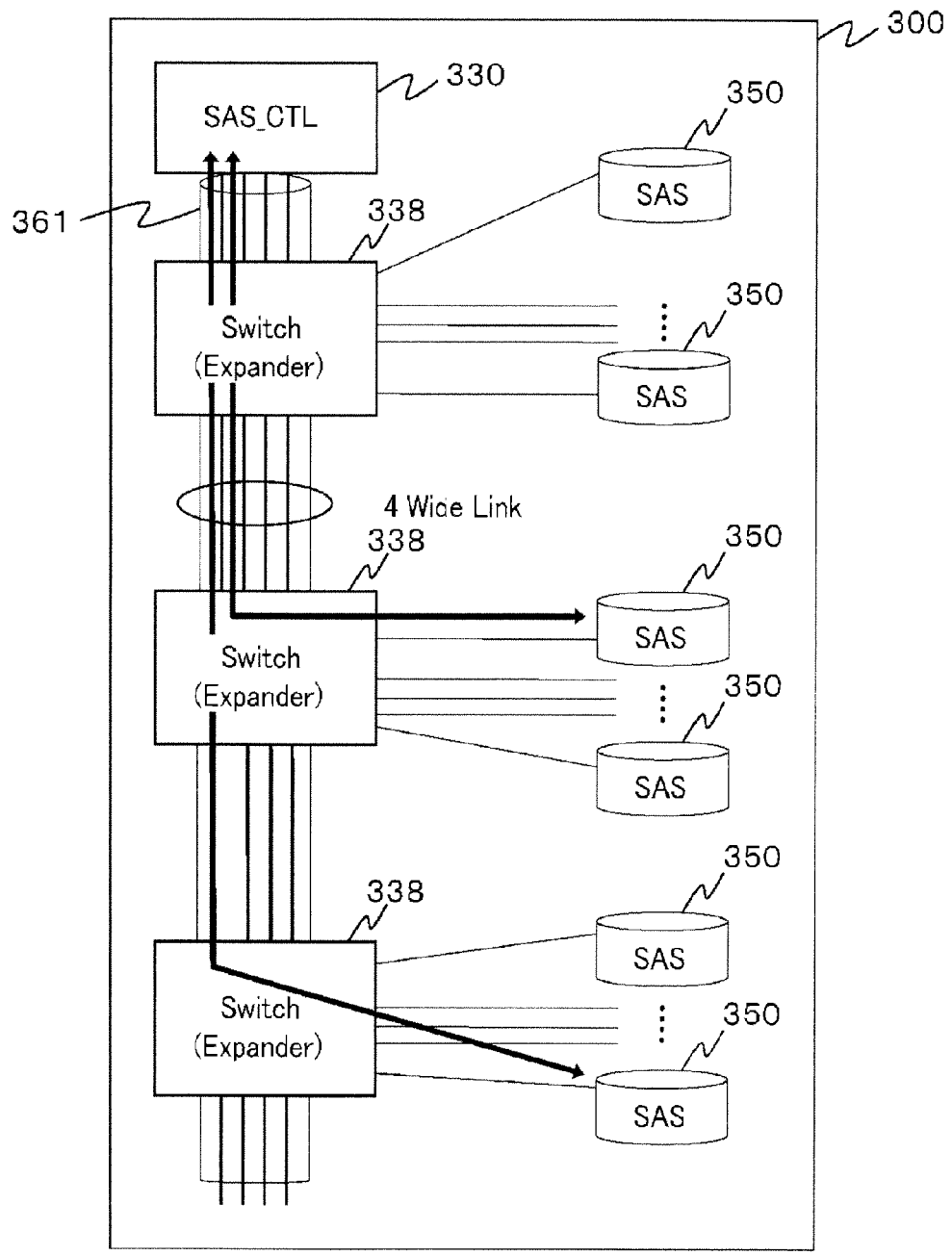
FIG. 4 is a diagram showing a configuration of the storage apparatus according to the present embodiment.

FIG. 4 shows a state where the controller 330 included in the basic chassis 310 and each of the storage drives 350 are coupled to each other with the serial link 361 via the expander 338. The controller 330 and each of the storage drives 350 are coupled to each other via the serial link 361 in a one-to-one correspondence.

<Other Configuration of Storage Apparatus>

Note that the storage apparatus 300 according to the present embodiment has a configuration including storage drives 350; however, the storage apparatus 300 may be configured not to include the storage drives 350. In this case, the storage apparatus 300 is communicatively coupled with a storage device (not shown) including a plurality of storage drives 350 via a network such as SAN or LAN. Moreover, the storage apparatus 300 writes and reads data to and from the above-mentioned storage drive 350 via the network.

<Data Write Process and Data Read Process>

Figure 5:
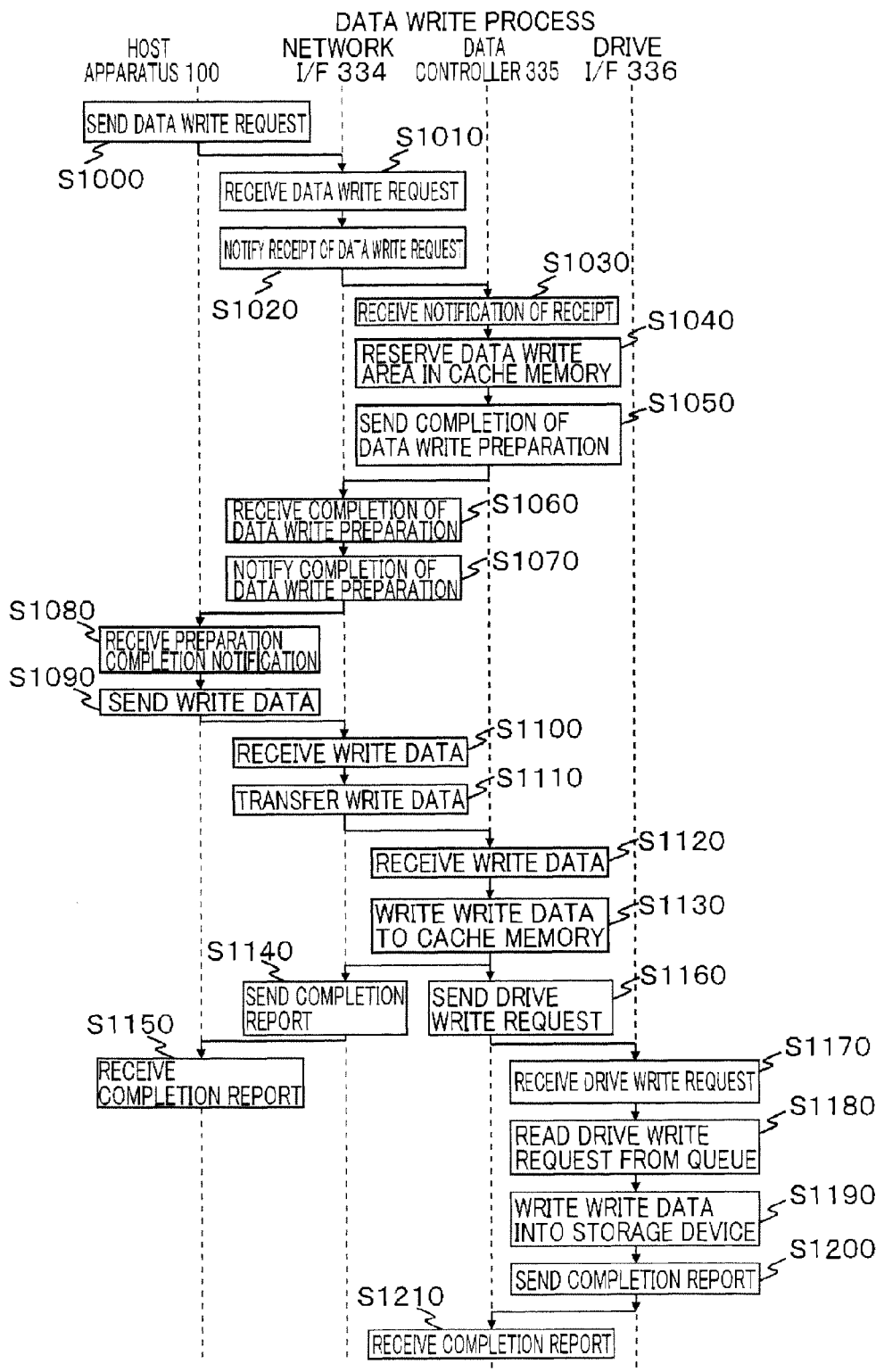
FIG. 5 is a flowchart showing a flow of a data write process according to the present embodiment.

FIG. 5 is a flowchart illustrating the write process which the storage apparatus 300 performs upon receiving from the host apparatus 100 a frame containing data write request.

The frame of a data write request sent from the host apparatus 100 is received by the network I/F 334 of the storage apparatus 300 (S1000, S1010). Upon receiving the frame, the network I/F 334 notifies the data controller 335 of the receipt (S1020).

Upon receiving the above notice from the communication I/F 334 (S1030), the data controller 335 reserves a data write area in the cache memory 337 (S1040). After reserving the data write area in the cache memory 337, the data controller 335 sends the communication I/F 334 a message that preparation for data write has been completed (S1050). Upon receiving the message that preparation for data write has been completed (S1060), the communication I/F 334 sends the message to the host computer 100 (S1070). Upon receiving the message that preparation for data write has been completed (S1080), the host computer 100 sends the write data to the communication I/F 334 (S1090). Upon receiving the write data, the communication I/F 334 transfers the data to the data controller 335 (S1100, S1110). Upon receiving the write data from the communication I/F 334 (S1120), the data controller 335 generates a drive write request based on the data write request of the frame and stores the write data into the cache memory 337 (S1130).

Further, the data controller 335 notifies the network I/F 334 of the data write completion report.

The network I/F 334 sends the completion report to the host apparatus 100 (S1140), and the host apparatus 100 receives the completion report (S1150).

Meanwhile, the data controller 335 sends the generated drive write request to the drive I/F 336 (S1160, S1170).

Upon receipt of the drive write request, the drive I/F 336 registers the drive write request in a write processing queue. The drive I/F 336 reads the drive write request from the write processing queue as needed (S1180). From the cache memory 337, the drive I/F 336 reads write data designated by the drive write request thus read out, and writes the write data thus read, into the storage drive 350 (S1190).

Next, the drive I/F 336 notifies the data controller 335 of a report indicating that a write of the write data requested by the drive write request has been completed (completion report) (S1200), and the data controller 335 receives the completion report thus sent (S1210).

Figure 6:
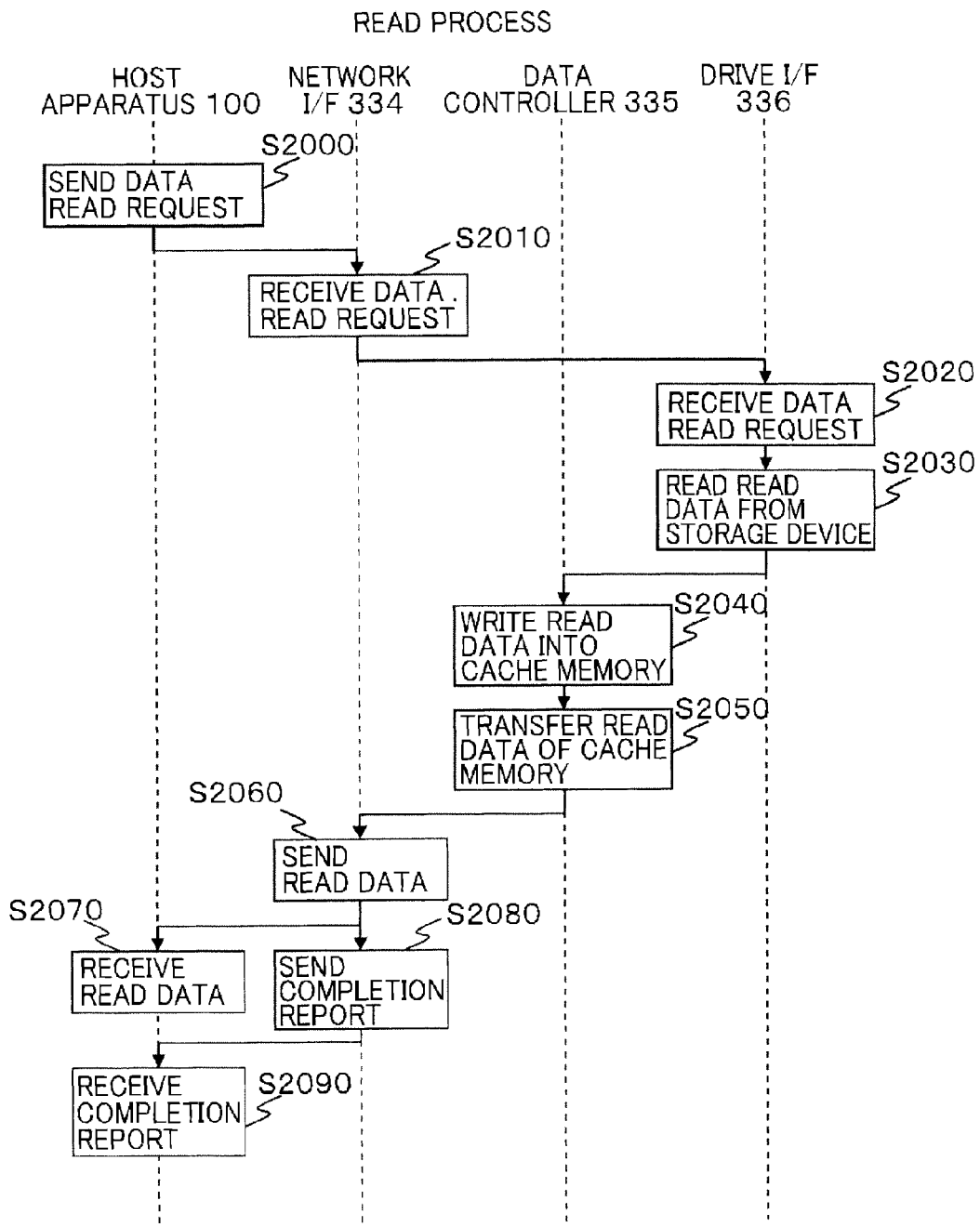
FIG. 6 is a flowchart showing a flow of a data read process according to the present embodiment.

FIG. 6 is a flowchart illustrating the read process performed by the storage apparatus 300 when the storage apparatus 300 receives a frame including a data read request from the host apparatus 100.

The frame sent by the host apparatus 100 is received by the network I/F 334 of the storage apparatus 300 (S2000, S2010). Upon receipt of the frame from the host apparatus 100, the network I/F 334 notifies the drive I/F 336 of the frame receipt.

Upon receipt of the notification from the network I/F 334 (S2020), the drive I/F 336 reads, from the storage drive 350, data designated by the data read request included in the frame (designated for example with an LBA (Logical Block Address)) (S2030). Note that the processing of reading from the storage drive 350 (S2030) is omitted if the read data exists in the cache memory 337 (when the data to be read is cache hit). The data controller 335 writes the data read by the drive I/F 336 into the cache memory 337 (S2040). The data controller 335 sends the data written in the cache memory 337 to the network I/F 334 as needed (S2050).

The network I/F 31 sequentially sends the read data sent from the data controller 335, to the host apparatus 100 (S2060, S2070). Upon completion of sending the read data, the network I/F 334 sends a completion report to the host apparatus (S2080), and the host apparatus 100 receives the completion report thus sent (S2090).

<Expander>

Figure 7:
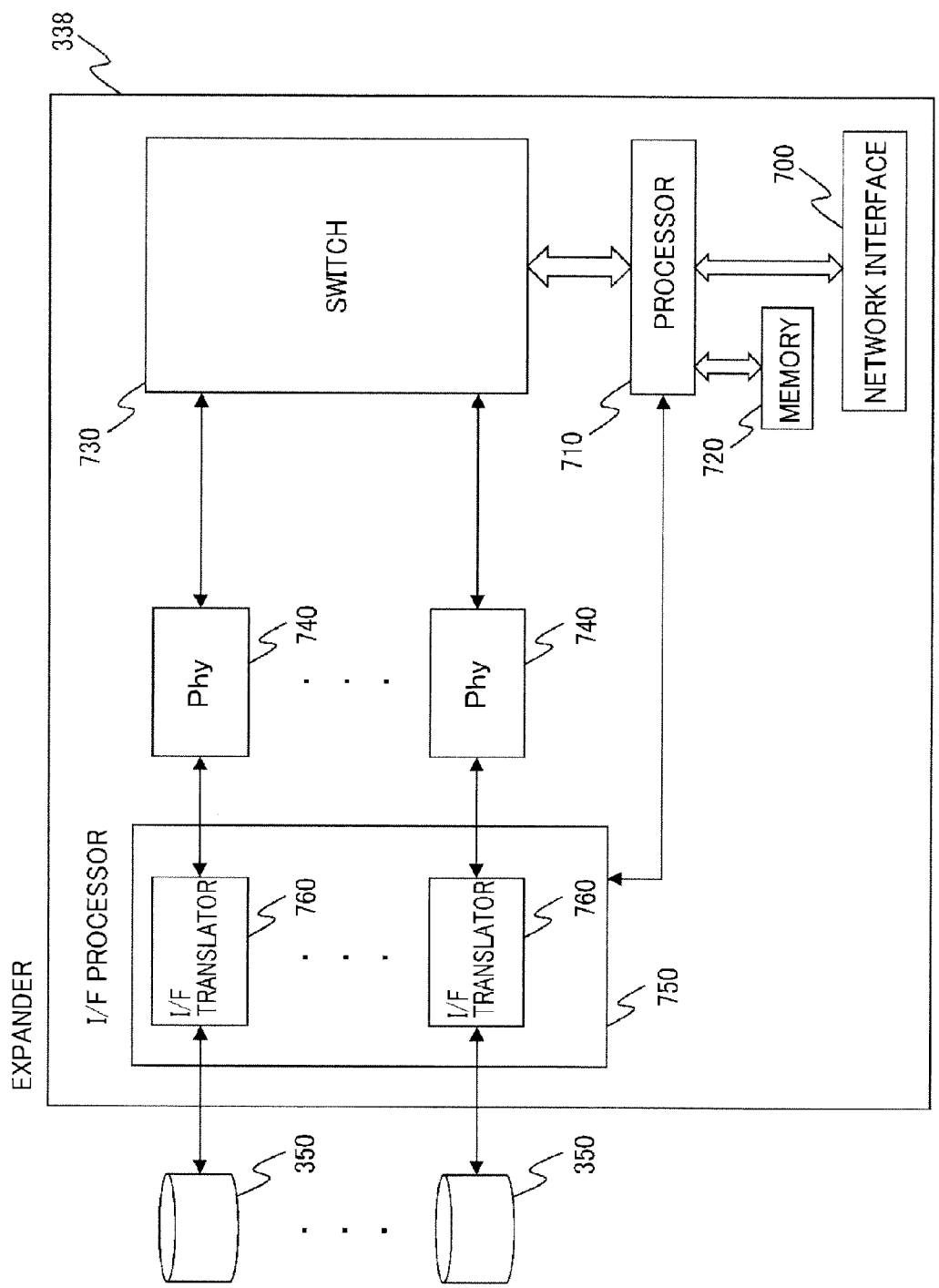
FIG. 7 is a diagram showing a configuration of an expander according to the present embodiment.

FIG. 7 shows a hardware configuration of the expander 338. As shown in FIG. 7, the expander 338 includes a plurality of communication ports (hereinafter referred as Phy) 740, a switch circuit 730, a processor 710, a memory 720, a network interface 700, and an I/F (Inter/Face) processor (drive voltage identifying unit) 750.

The I/F processor 750 includes a plurality of I/F translators 760. The I/F translators 760 are coupled to the storage drives 350 and the Phys 740, respectively. Each I/F translator 760 translates between data sent and received in accordance with an access method to which the Phy 740 conforms and data sent and received in accordance with an access method to which the storage drive 350 conforms. Note that the I/F processor 750 may be implemented with hardware such as an LSI (Large-Scale Integrated Circuit) or by execution of a control program stored in the memory 720 or the like by the processor 710.

When the storage apparatus 300 is activated or when the I/F translator 760 detects that a new storage drive 350 is mounted in the mounting slot 351, the I/F translator 760 discriminates the access method of the storage drive 350 coupled to the storage apparatus 300.

Each Phy 740 includes a serial-parallel conversion circuit such as a SerDes (Serializer/Deserializer).

The switch circuit 730 includes an ECR (Expander Connection Router) that controls data transfer between the Phys 740 according to settings of routing and zoning stored in the memory 720, an ECM (Expander Connection Manager) that performs routing and zoning settings, a BPP (Broadcast Primitive Processor), and the like.

The BPP monitors the switch circuit 730 and devices coupled to the switch circuit 730 and a change in their communication states, such as whether the storage drive 350 is inserted or withdrawn, whether a link is established or not (linkup/linkdown), and whether there is a communication failure or not. In addition, upon detection of the above-described change in state, the BPP sends a broadcast frame from the Phy 740.

<I/F Translator>

As described above, the I/F translator 760 translates between signals in accordance with an access method to which the Phy 740 conforms and signals in accordance with an access method to which the storage drive 350 conforms. The access method to which the Phy 740 conforms is specified by SAS, for example.

The access method to which the storage drive 350 conforms varies from one storage drive 350 mounted on the storage apparatus 300 to another. For example, in the case of SSD internally mounted with MRAM, the access method conforms, for example, to an interface of SRAM (Static RAM) operating at an operating voltage of 5V (volts) or 3V. Alternatively, in the case of SSD internally mounted with FeRAM, the access method conforms, for example, to an interface of DDR2 (Double-Data-Rate2) operating at an operating voltage of 1.8V. Further, in the case of SSD internally mounted with PRAM, the access method conforms, for example, to an interface of DRAM (Dynamic RAM) operating at an operating voltage of 3V or an interface of DDR3 (Double-Data-Rate3) operating at an operating voltage of 1.5V.

Figure 8:
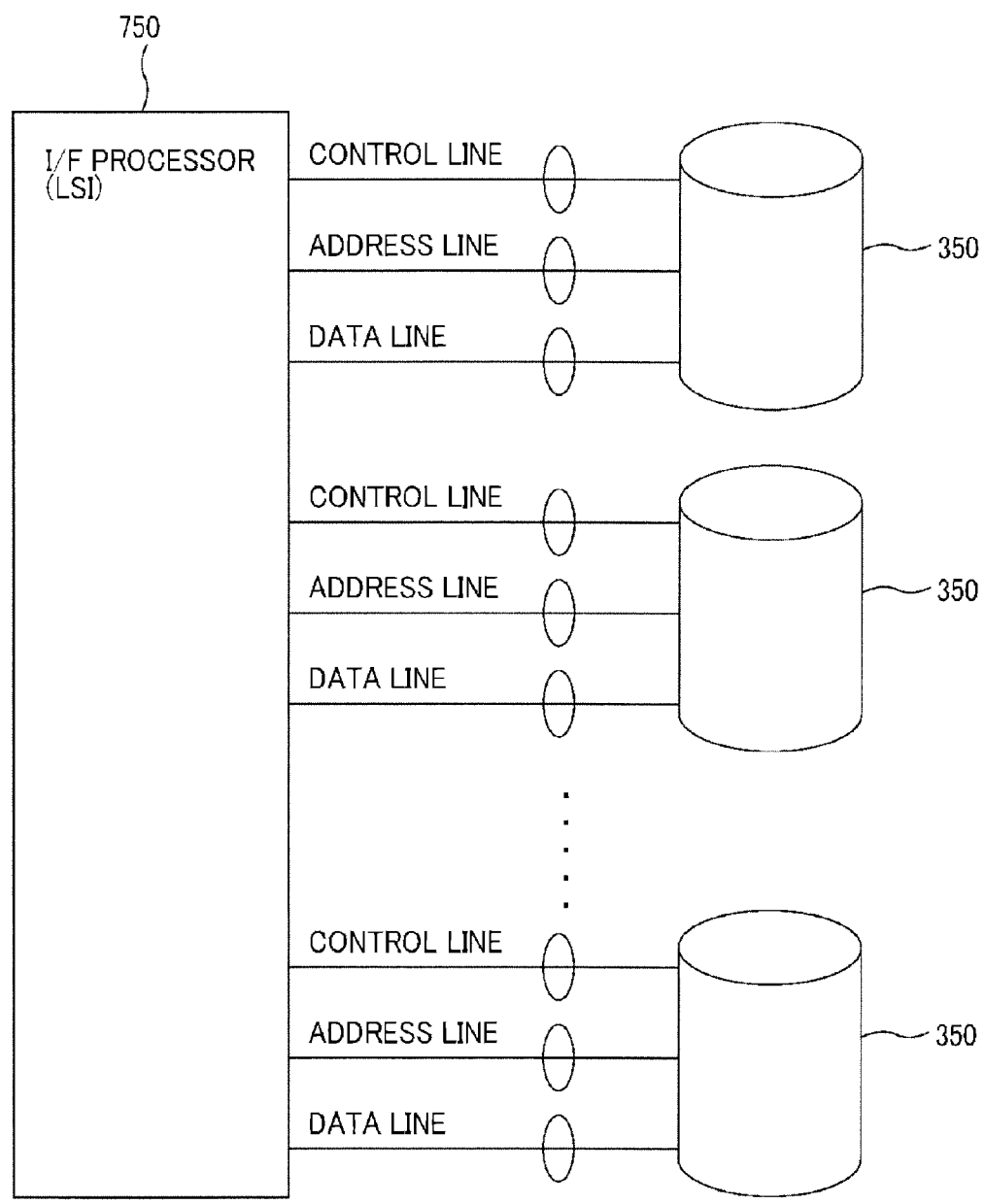
FIG. 8 is a diagram showing a coupling between an I/F processor and a storage drive.

The I/F processor 750 and the storage drive 350 are coupled to each other via connection lines including a control line, an address line, and a data line as shown in FIG. 8. The I/F processor 750 accesses the storage drive 350 coupled thereto via such control lines by an access method according to the storage drive 350.

Figure 9:
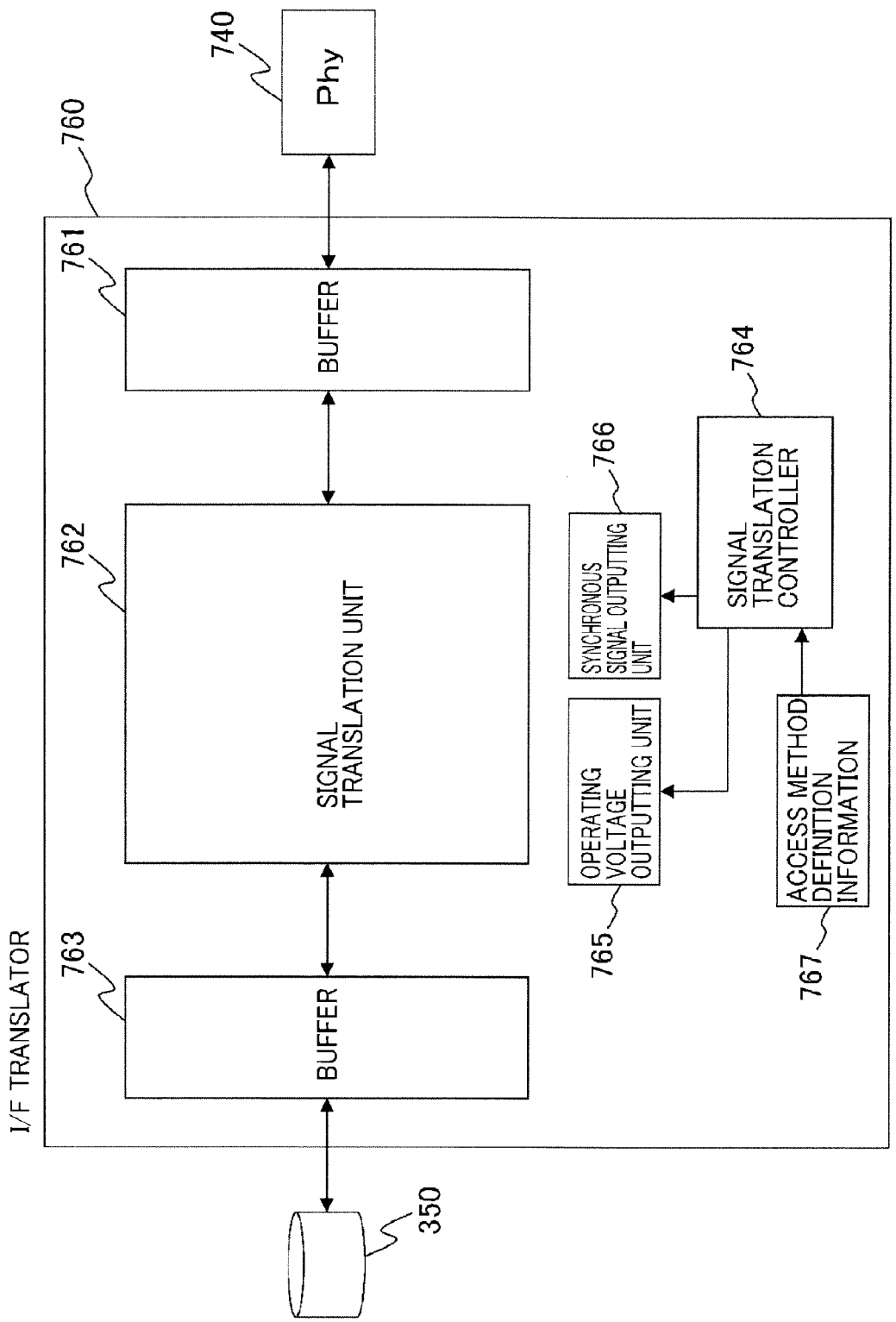
FIG. 9 is a diagram showing a configuration of an I/F translation unit according to the present embodiment.

A configuration of the I/F translator 760 included in the I/F processor 750 is shown in FIG. 9.

The I/F translator 760 includes a buffer 761, a signal translation unit 762, a buffer 763, a signal translation controller 764, an operating voltage output unit (drive voltage supplying unit) 765, a synchronous signal output unit 766, and an access method definition information 767.

The buffer 761 is a circuit to store data sent to and received from the Phy 740. Data stored in the buffer 761 is data sent and received in accordance with an access method to which the Phy 740 conforms.

On the other hand, the buffer 763 is a circuit to store data sent to and received from the storage drive 350. Data stored in the buffer 763 is data sent and received in accordance with an access method to which the storage drive 350 conforms.

The signal translation unit 762 is a circuit which translates between data sent and received in accordance with an access method to which the Phy 740 conforms, and data sent and received in accordance with an access method to which the storage drive 350 conforms, in accordance with an instruction given by the signal translation controller 764.

The signal translation controller 764 controls the signal translation unit 762, the operating voltage output unit 765, and the synchronous signal output unit 766 according to an access method to which the Phy 740 conforms and according to an access method to which the storage drive 763 conforms.

Further, when the storage apparatus 300 initiates or when the signal translation controller 764 detects that a new storage drive 350 is coupled to the storage apparatus 300, the signal translation controller 764 discriminates the access method of the storage drive 350 coupled to the storage apparatus 300.

In the discrimination of the access method, the signal translation controller 764 raises a drive voltage applied to the storage drive 350 mounted in the mounting slot 351 from a voltage equal to or lower than the rated drive voltage of the storage drive 350, and thereby identifies a voltage enabling data write to or data read from the storage drive 350.

Specifically, the signal translation controller 764 first acquires information of a mountable memory management table 450, described later, from the controller 330. Then, the signal translation controller 764 sorts access methods, which are provided in the mountable memory management table 450 and to which the storage apparatus 300 conforms, in the ascending order of the operating voltage thereof, and writes data into the storage drive 350 in accordance with the access methods in the ascending order of the operating voltage. Then, the signal translation controller 764 identifies the operating voltage of the storage drive 350 depending on whether or not the data can be read from the storage drive 350.

Information on a range of the rated voltage and operating voltage (including minimum operating voltage and maximum operating voltage), the operating frequency and its range (including minimum operating frequency and maximum operating frequency), the read/write timing, and the like for access to the storage drive 350 according to the access methods is recorded in the access method definition information 767. The signal translation controller 764 controls the operating voltage output unit 765 and the synchronous signal output unit 766 with reference to the access method definition information 767 so as to access the storage drive 350 in accordance with an appropriate access method.

When the data written into the storage drive 350 can be read correctly, the signal translation controller 764 determines that the storage drive 350 conforms to the access method. Thereinafter, access to the storage drive 350 is made in accordance with that access method. Further, the signal translation controller 764 sends, to the controller 330, identification information of the storage drive 350 and the access method with which the storage drive 350 could be accessed. Then, the controller 330 sends, to the administrator terminal 200, identification information of the storage drives 350 coupled to the storage apparatus 300 and access methods to which the respective storage drives 350 conform.

When access to the storage drive 350 cannot be made correctly with any access method provided in the mountable memory management table 450, the signal translation controller 764 sends, to the controller 330, a message notifying of this access failure. In this case, the controller 330 sends, to the administrator terminal 200, identification information of the storage drive 350 and a message that the access method of the storage drive 350 could not be identified.

The access method definition information 767 contains control information for sending and receiving data with the access methods, such as the operating voltage and the operating frequency. The signal translation controller 764 controls the operating voltage output unit 765 and the synchronous signal output unit 766 so as to obtain the operating voltage and the operating frequency provided in the access method definition information 767.

The operating voltage output unit 765 outputs a drive power to the buffer 761 so that the buffer 761 can send and receive data to and from the Phy 740 in accordance with an access method to which the Phy 740 conforms. Further, the operating voltage output unit 765 outputs a drive power to the buffer 763 so that the buffer 763 can send and receive data to and from the storage drive 350 in accordance with an access method to which the storage drive 350 conforms.

The synchronous signal output unit 766 outputs a synchronous signal to the buffer 761 so that the buffer 761 can send and receive data to and from the Phy 740 in accordance with the access method to which the Phy 740 conforms. Further, the synchronous signal output unit 766 outputs a synchronous signal to the buffer 763 so that the buffer 763 can send and receive data to and from the storage drive 350 in accordance with the access method to which the storage drive 350 conforms.

Figure 10:
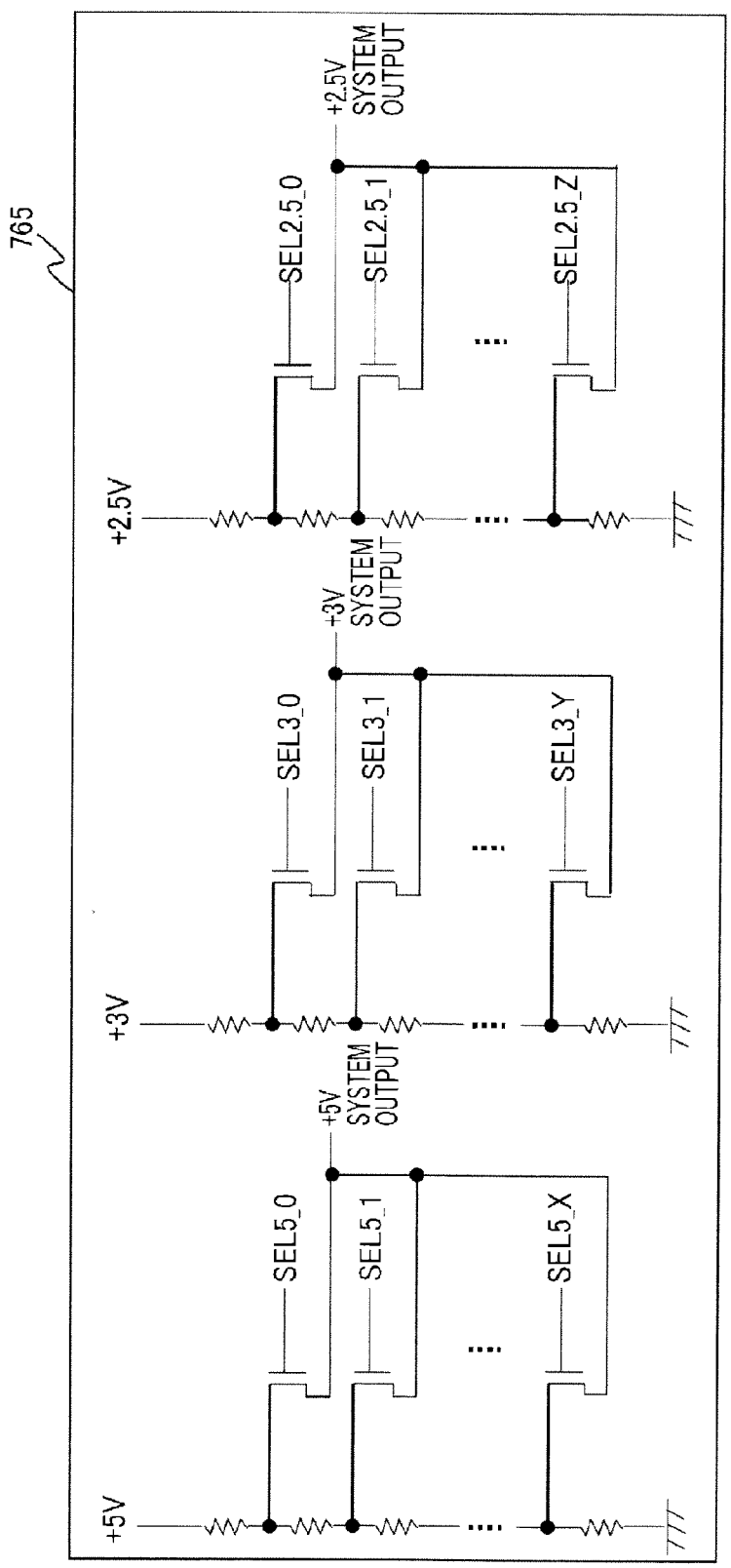
FIG. 10 is a diagram showing a configuration of an operating voltage output unit according to the present embodiment.

As shown in FIG. 10, the circuit of the operating voltage output unit 765 is configured to select and output a desired operating voltage out of a plurality of operating voltages according to a select signal inputted from the signal translation controller 764. The signal translation controller 764 inputs a select signal to the operating voltage output unit 765 so that the operating voltage output unit 765 can output the operating voltage conforming to the access method.

Configuration of Logical Volume

Figure 11:
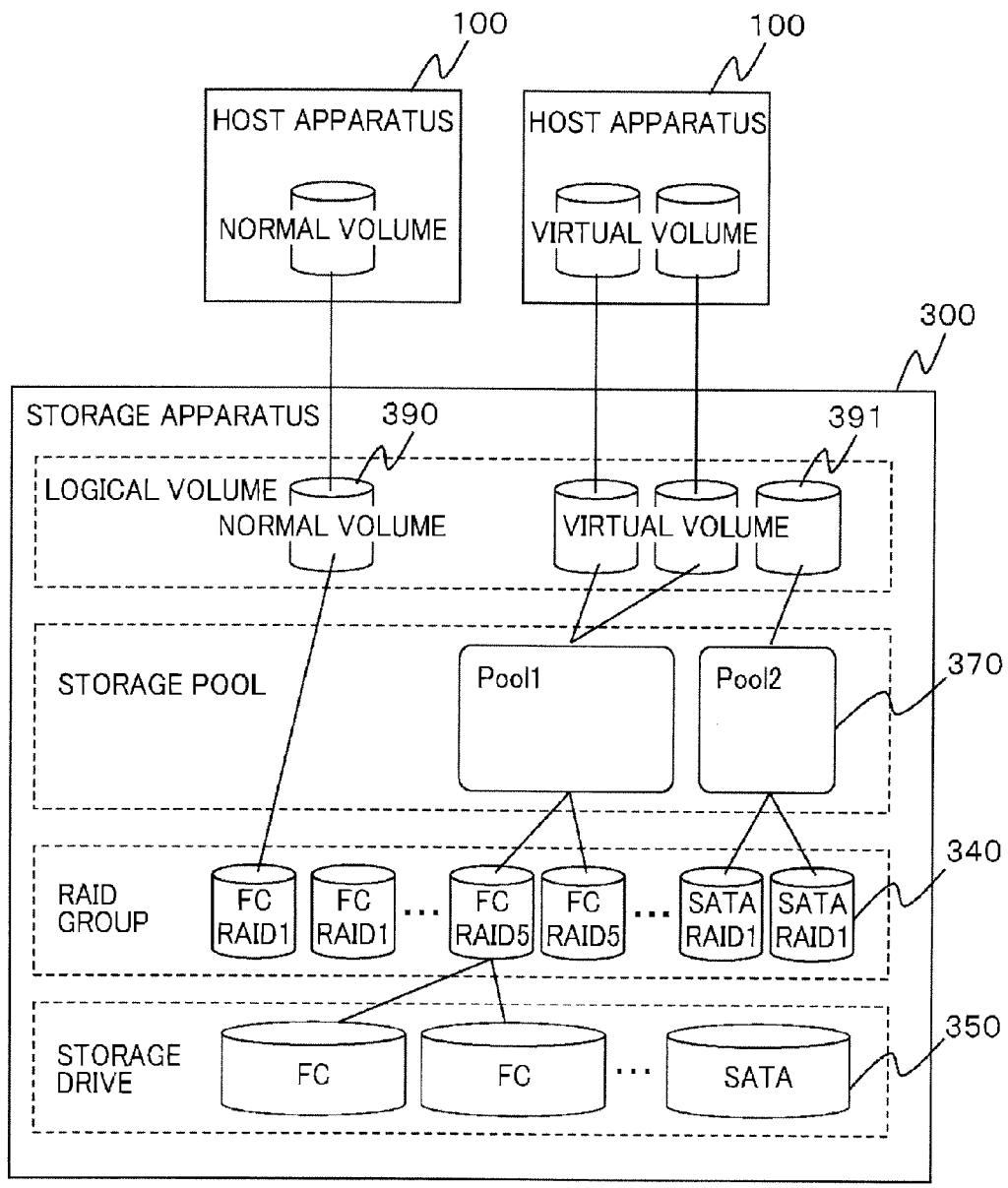
FIG. 11 is a diagram for explaining allocation of storage areas to the host apparatus.

FIG. 11 is a diagram illustrating how the storage apparatus 300 supplies the host apparatus 100 with a storage resource. The storage apparatus 300 provides a logical volume to the host apparatus 100. The host apparatus 100 can access a storage resource of the storage apparatus 300 by designating a logical volume identifier LUN.

In the storage apparatus 300, RAID groups 340 are organized with the storage drives 350. The administrator terminal 200 and the storage apparatus 300 gives an identifier to each of the RAID groups 340 to manage attributes of each of the RAIDs (for example, RAID level, interface types and model numbers of the storage drives 350 configuring the RAID group 340, the configuration, performance, and reliability of the RAID group 340, and the like).

Logical volumes which the storage apparatus 300 provides to the host apparatus 100 include a normal volume 390 being a logical volume allocated directly to the RAID groups 340, and a virtual volume 391 being a logical volume supplied indirectly via a storage pool 370 formed of a storage resource provided by the RAID groups 340. The RAID groups 340 are statically allocated to the normal volume 390, while the RAID groups 340 are dynamically allocated to the virtual volume 391 via the storage pool 370.

With this configuration, the storage apparatus 300 can allocate a logical volume of any capacity and attributes to the host apparatus 100 regardless of the volume and attributes of a storage resource currently available. This realizes a flexible operation mode where a storage resource of the volume and quality according to needs is supplied at the time capacity expansion or performance improvement is actually needed due to changes in use status of the storage area or emergence of a new need. This configuration also facilitates designing of the storage system 1000 and a data center, so that the operational efficiency of the storage system 1000 can be improved with reduction in initial costs of the storage system 1000, prompt supply of latest equipments and reduction in the drive power and operation costs of cooling equipment and the like.

In response to a request from the administrator terminal 200, the storage apparatus 300 configures the virtual volume 391 with the storage pool 370 as a creation source. Also, in response to a request from the administrator terminal 200, the storage apparatus 300 allocates the virtual volume 391 to the storage apparatus 300. Note that, the virtual volume 391 is given information (an identifier) used when the host apparatus 100 identifies the virtual volume 391 being the access target in accessing the virtual volume 391. Further, when a write occurs to an address of the virtual volumes 391 to which no RAID group 340 has been allocated, the storage apparatus 300 newly allocates a part of the storage area of the RAID groups 340 to the address.

<Function of Administrator Terminal>

Figure 12:
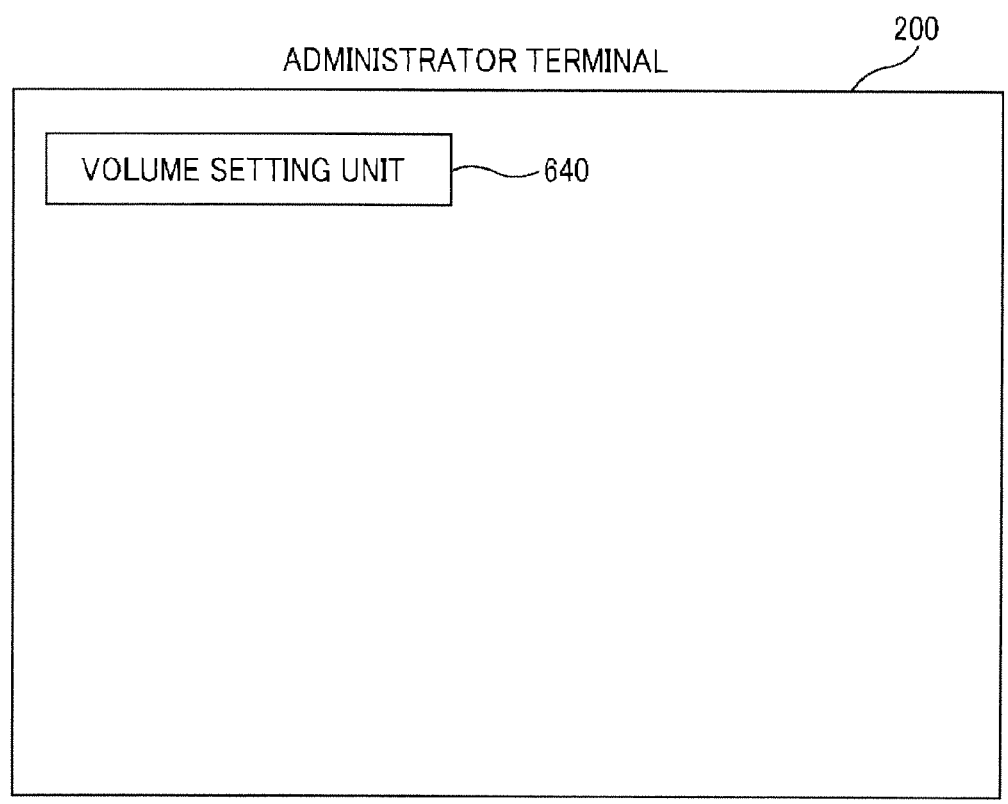
FIG. 12 is a diagram showing a configuration of an administrator terminal according to the present embodiment.

The administrator terminal 200 includes a volume setting unit 640 as shown in FIG. 12.

The volume setting unit 640 is implemented by having the CPU 210 execute a program which is read to the memory 220. Alternatively, the volume setting unit 640 is implemented by hardware of the administrator terminal 200.

The volume setting unit 640 sends, to the storage apparatus 300, a creation request or deletion request of the storage pool 370. Also, the volume setting unit 640 sets a logical volume (normal volume 390 or virtual volume 391). For example, the volume setting unit 640 sends, to the storage apparatus 300, a creation request or deletion request of the virtual volume 391, an allocation request or deallocation request of the virtual volume 391 with respect to the host apparatus 100. Also, the volume setting unit 640 performs processing relating to setting of the RAID groups 340.

Function of Storage Apparatus

Figure 13:
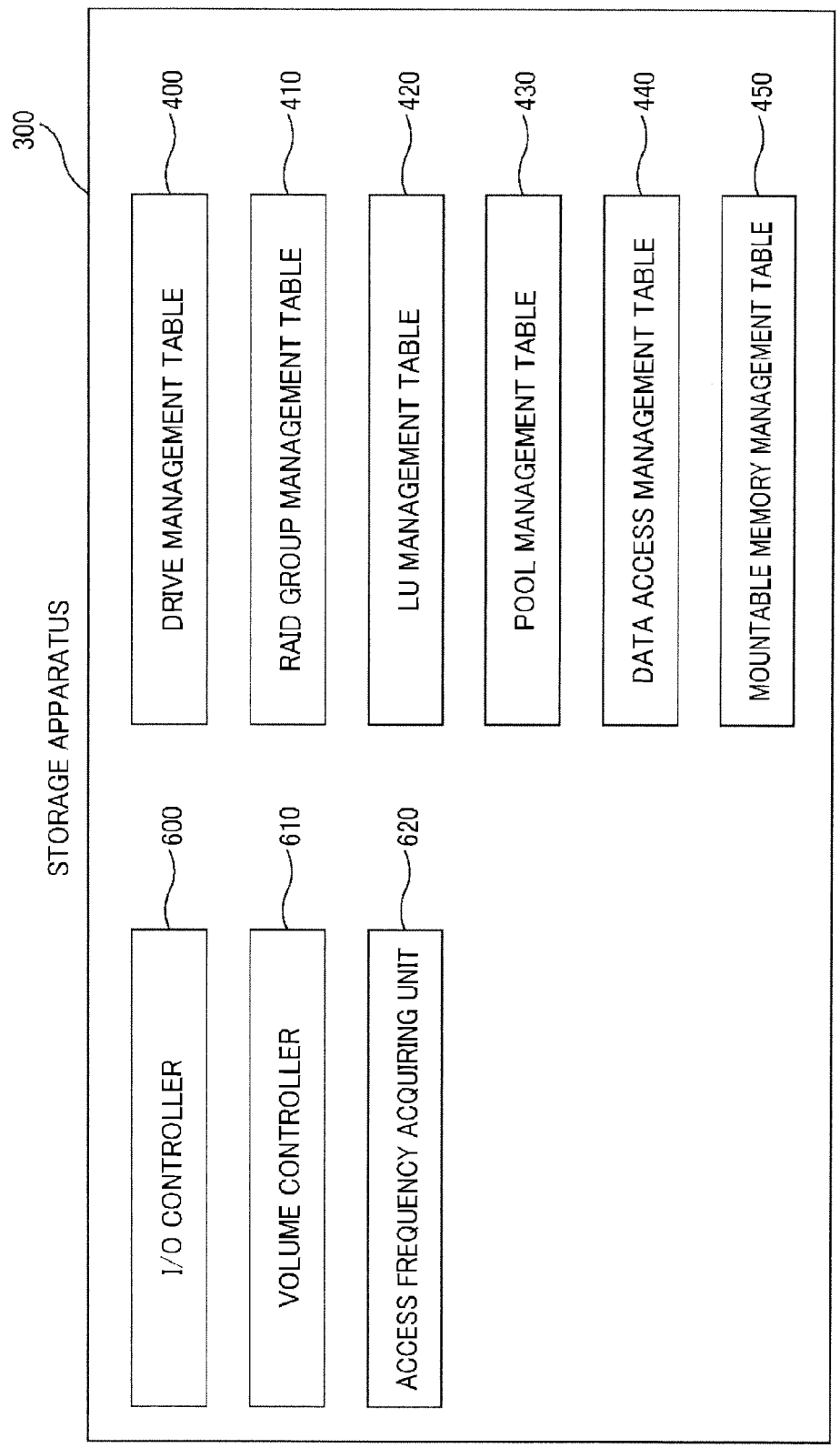
FIG. 13 is a diagram showing a configuration of the storage apparatus according to the present embodiment.

As shown in FIG. 13, the storage apparatus 300 includes an I/O controller 600, a volume controller (virtual volume manager) 610, an access frequency acquiring unit 620, a drive management table 400, a RAID group management table 410, a LU management table 420, a pool management table 430, a data access management table 440, and a mountable memory management table 450.

Such functions of the storage apparatus 300 are implemented by having hardware or the CPU 331 of the controller 330 read and execute programs stored in the memory 333 or the storage drive 350 (for example, BIOS (Basic Input Output System), firmware, operating system, or the like).

The drive management table 400, the RAID group management table 410, the LU management table 420, the pool management table 430, the data access management table 440, and the mountable memory management table 450 are stored, for example, in the memory 333 of the controller 330.

When the storage apparatus 300 receives a frame containing a data write request or data read request from the host apparatus 100, the I/O controller 600 performs processing relating to a data write to the storage drive 350 and a data read from the storage drive 350. In response to the storage drive 350 access request from the host apparatus 100, the I/O controller 600 controls the I/F processor 750 and accesses the storage drive 350 at an operating voltage specified by the I/F processor 750.

In response to a request from the volume setting unit 640, the volume controller 610 refers to and updates the mountable memory management table 450, the drive management table 400, the RAID group management table 410, the LU management table 420, and the pool management table 430 to perform processing relating to the management of the storage pool 370, the logical volume, the RAID group 340, the storage drive 350, and the like.

The access frequency acquiring unit 620 performs processing relating to acquisition of the frequency of access requests which the host apparatus 100 sends to the storage apparatus 300.

<Mountable Memory Management Table>

FIG. 14 shows an example of the mountable memory management table 450. The mountable memory management table 450 stores a list of nonvolatile memories configuring the SSD mountable in the storage apparatus 300 according to the present embodiment.

The mountable memory management table 450 stores for each of the nonvolatile memories, that is, for each type of the storage drives 350 in association with the interface (access mode), operating voltage, allowed number of times of data write, and data access time of the nonvolatile memory.

The storage apparatus 300 according to the present embodiment is capable of mounting an SSD incorporating five types of the nonvolatile memories as shown in FIG. 14. Note that, when a type of the storage drive mountable in the storage system 300 is newly employed, the interface (access method), operating voltage, allowed number of times of data write, and data access time of the storage drive can be registered in the mountable memory management table 450 registered at the time of manufacturing the storage system 300, using the administrator terminal 200.

<Drive Management Table>

FIG. 15 shows an example of the drive management table 400. The drive management table 400 stores each of the storage drives 350 in association with its type, operating voltage, access mode, and the like.

As shown in FIG. 15, the drive management table 400 includes a "Drive ID" column, an "Apparatus ID" column, a "Drive type" column, a "Storage capacity" column, an "Operating voltage" column, a "Number of writable times" column, an "Interface" column, an "Access time" column, a "RGID" column, a "Real LUID" column, and a "Number of write times" column.

The "Drive ID" column stores identification information of the storage drive 350. The "Apparatus ID" column stores identification information of the storage apparatus 300 in which the storage drive 350 is mounted. The "Drive type" column stores the type of the storage drive 350. According to the present embodiment, the type of a semiconductor memory internally included in the storage drive 350 is provided.

The "Storage capacity" column lists therein the amount of data recordable in the storage drive 350. The "Operating voltage" column lists therein the operating voltage for access to the storage drive 350. The operating voltage is an operating voltage for access to a semiconductor memory internally included in the storage drive 350 and is also listed in the mountable memory management table 450.

The "Number of writable times" column lists therein an upper limit value of an allowed number of times of data write to the storage drive 350. The "Interface" column lists therein an access method to a semiconductor memory internally included in the storage drive 350. The "Access time" column lists therein time required to access a semiconductor memory internally included in the storage drive 350.

The "RGID" column lists therein identification information of the RAID group 340 configured to include the storage drive 350. The example shown in FIG. 15 indicates that a RAID group 340 of RGID0 is configured with two storage drives 350 having a Drive ID of 0 and 1, a RAID group 340 of RGID1 is configured with five storage drives 350 having a drive ID of 2 to 6, and a RAID group 340 of RGID2 is configured with four storage drives 350 having a drive ID of 7 to 10.

Note that, the volume controller 610 is capable of configuring RAID according to various schemes when configuring RAID using storage drives 350. For example, like RGID0, RAID can be configured using storage drives 350 of the same access method (interface). Further, for example, like RGID1, RAID can be also configured by including storage drives 350 of a plurality of access methods (interfaces) mixed together. Like RGID2, RAID can be also configured using storage drives 350 of the same number of writable times.

The scheme with which the volume controller 610 configures RAID is instructed by an operator operating the administrator terminal 200, for example.

As described above, access times of the storage drives 350 configuring the RAID for access to a logical volume configured on the RAID can be made equal by making the access methods of the storage drives 350 configuring the RAID the same. Thus, each of the storage volumes 350 can access the logical volume in the access time of the storage volume 350 without being affected by a storage volume 350 of slower access time.

As described above, by making the numbers of times data is writable to the storage drives 350 configuring the RAID the same, data can be written to a logical volume configured on the RAID up to the number of writable times of each of the storage drives 350 without limitation by a storage volume 350 of lower number of writable times.

Further, a variety of user's needs can be flexibly answered by configuring the RAID mixed with the storage drives 350 of a plurality of access methods as described above.

The "Real LUID" column lists therein identification information of the normal volume 390 configured on a RAID group 340 described above. The example shown in FIG. 15 indicates that two normal volumes 390 LU0 and LU1 are configured on a RAID group 340 having RGID of 0, three normal volumes 390 LU2, LU3, and LU4 are configured on a RAID group 340 having RGID of 1, and one normal volume 390 LU5 is configured on a RAID group 340 having RGID of 2.

The "Number of write times" column lists therein an accumulated value of the number of times data has already been written to the storage drive 350. The example shown in FIG. 15 indicates that the number of times data is written to each of the storage drives 350 of the drive ID of 7 to 10 is 0.

<RAID Group Management Table>

The RAID group management table 410 lists therein information relating to each of the RAID groups 340 provided by the storage apparatus 300. FIG. 16 shows an example of the RAID group management table 410.

The RAID group management table 410 includes a "RGID" column, a "Storage capacity" column, an "Access time" column, a "Real LUID" column, a "Number of writable times" column, a "RAID level" column, a "Used capacity" column, and a "Number of write times" column.

The "RGID" column lists therein identification information of the RAID group 340. The "Storage capacity" column lists therein the sum of storage capacities of the storage drives 350 configuring the RAID group 340.

The "Access time" column lists therein the access time at the time of writing data into the normal volume 390 on the RAID group 340. The access time is a maximum value of access times of each of the storage drives 350 configuring the RAID group 340. For example, the RAID group 340 of RGID1 includes two MRAM drives and three PRAM drives as listed in the drive management table 400. Since the access time of the MRAM drive is 30 ns (nanoseconds) and the access time of the PRAM drive is 10 ns (nanoseconds), the access time of the RAID group 340 of RGID1 is 30 ns.

The "Real LUID" column states identification information of the normal volume 390 configured on the RAID group 340.

The "Number of writable times" column lists therein an upper limit value of an allowed number of times of data write into the logical volume on the RAID group 340. The number of writable times is a minimum value of the numbers of writable times of the storage drives 350 configuring the RAID group 340. For example, the RAID group of RGID1 is configured with two MRAM drives and three PRAM drives. Since the number of writable times of the MRAM drive is $16^{th}$ power of 10 and the number of writable times of the PRAM drive is $13^{th}$ power of 10 as listed in the drive management table 400, the number of writable times of the RAID group 340 of RGID1 is $13^{th}$ power of 10.

The "RAID level" column lists therein the RAID level of the RAID group 340 (for example, RAID5, RAID1+0, and the like). The "Used capacity" column lists therein the storage capacity already in use out of the storage capacities of the RAID group 340. The "Number of write times" column lists therein an accumulated values of the number of times data has already been written to the storage drives 350 configuring the RAID group.

<LU Management Table>

The LU management table 420 lists therein information relating to each of the normal volumes 390 provided by the storage apparatus 300. FIG. 17 shows an example of the LU management table 420.

The LU management table 420 includes a "Real LUID" column, a "Storage capacity" column, a "RGID" column, an "Access time" column, a "Number of write times" column, and an "Allocation destination" column.

The "Real LUID" column lists therein identification information of each of the normal volumes 390. The "Storage capacity" column lists therein a value of the storage capacity allocated to the normal volume 390. The "RGID" column lists therein identification information of the RAID group 340 configuring the normal volume 390. The "Access time" column lists therein the access time for access to the normal volume 390.

The "Number of write times" column lists therein an accumulated value of the number of times data has already been written to the normal volume 390. For example, the "Number of write times" column shows data has been written $5^{th}$ power of 10 times into the normal volume 390 having LUID of 0, and $5^{th}$ power of 9×10 times into the normal volume 390 having LUID of 1. Since these LUs are both included in the RAID group 340 of RGID0, the "Number of write times" column of RGID0 in the RAID group management table 410 shown in FIG. 16 lists that data has been written $6^{th}$ power of 10 times representing the sum of the numbers of times data has been written to LUID0 and to LUID1.

The "Allocation destination" column lists therein destination to which the normal volume 390 is allocated.

<Pool Management Table>

The pool management table 430 lists therein information relating to each of the storage pools 370 provided by the storage apparatus 300. FIG. 18 shows an example of the pool management table 430.

The pool management table 430 includes a "Pool ID" column, a "Storage capacity" column, a "Used capacity" column, an "Allocation destination" column, and a "Virtual LUID" column.

The "Pool ID" column lists therein identification information of the storage pool 370. The "Storage capacity" column lists therein a storage capacity set to the storage pool 370. The "Used capacity" column lists therein a storage capacity used for the host apparatus 100 out of the storage area provided by the storage pool 370.

The "Allocation destination" column lists therein identification information of the host apparatus 100 which can use the storage pool 370. The "Virtual LUID" column lists therein identification information of the virtual volume 391 which the storage pool 370 provides to the host apparatus 100.

<Access Frequency Management Table>

The access frequency management table 440 lists therein accumulated value of the number of access requests sent to each of the virtual volumes 391. FIG. 19 shows an example of the access frequency management table 440.

The example shown in FIG. 19 indicates that a total of 1,000 access requests have been sent from the host apparatus 100 to each of the virtual LUs 10, 20 and 30, and a total of 100,000 access requests have been sent from the host apparatus 100 to the virtual LU 40. The access frequency is acquired by the access frequency acquiring unit 620 and written into the access frequency management table 440.

Process Flow

Next, a flow of the process executed by the storage apparatus 300 according to the present embodiment will be described.

<Entire Access Method Discrimination Process>

First, the entire process flow in which the storage apparatus 300 discriminates the access method of the storage drive 350 mounted in the mounting slot 351 is described with reference to the flowcharts shown in FIG. 20 to FIG. 26.

The storage apparatus 300 executes the access method discrimination process for a mounted storage drive 350 when the storage apparatus 300 detects that a storage drive 350 whose access method is not yet discriminated, when the storage apparatus 300 itself is activated, when a request is sent from the administrator terminal 200, or the like.

Figure 20:
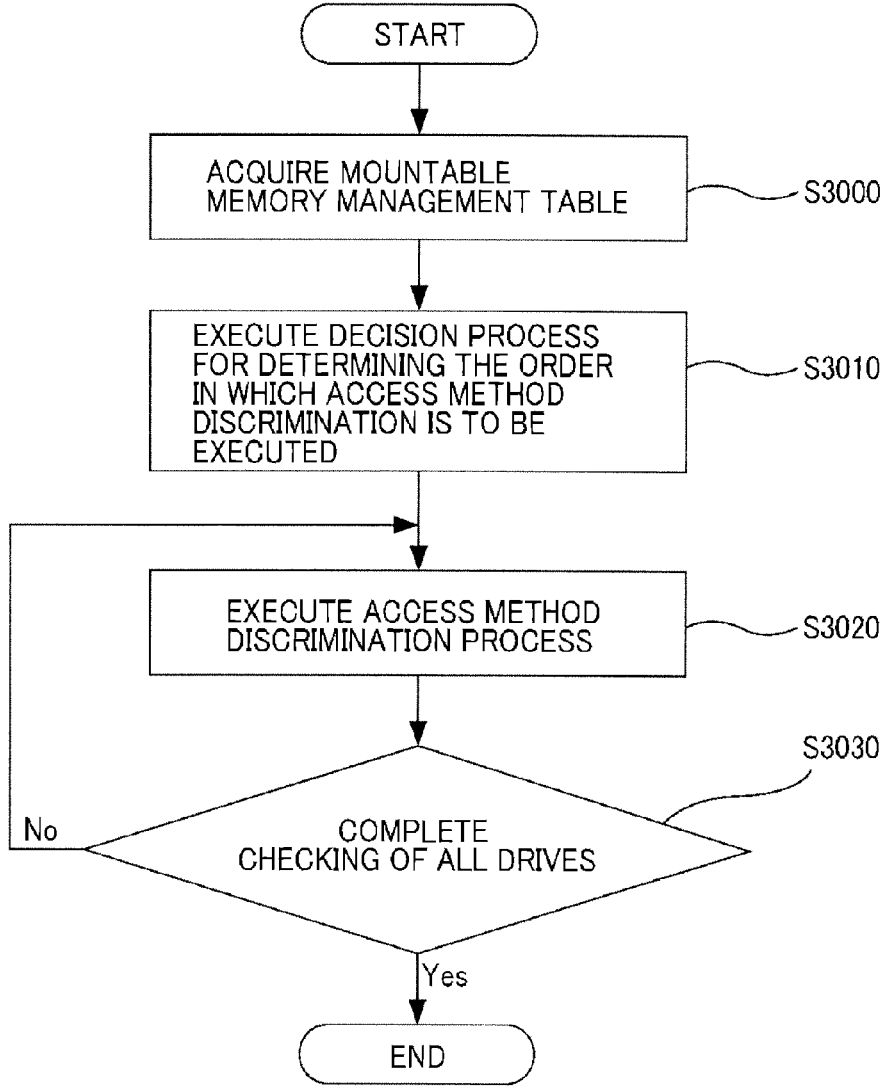
FIG. 20 is a flowchart showing the entire process flow of an access method discrimination process according to the present embodiment.

First, the storage apparatus 300 refers to the mountable memory management table 450 (S3000) and executes a process for determining the order in which access method discrimination process is to be carried out (hereinafter referred as access method discrimination order decision process) (S3010) as shown in FIG. 20. Then, the storage apparatus 300 executes an access method discrimination process (S3020). The storage apparatus 300 ends the access method discrimination process when all of the storage drives 350 subjected to the access method discrimination process have been performed (S3030).

Access Method Discrimination Order Decision Process

The access method discrimination order decision process decides the access method discrimination process execution order such that the access method discrimination process may be executed from an access method in the ascending order of operating voltage.

Figure 21:
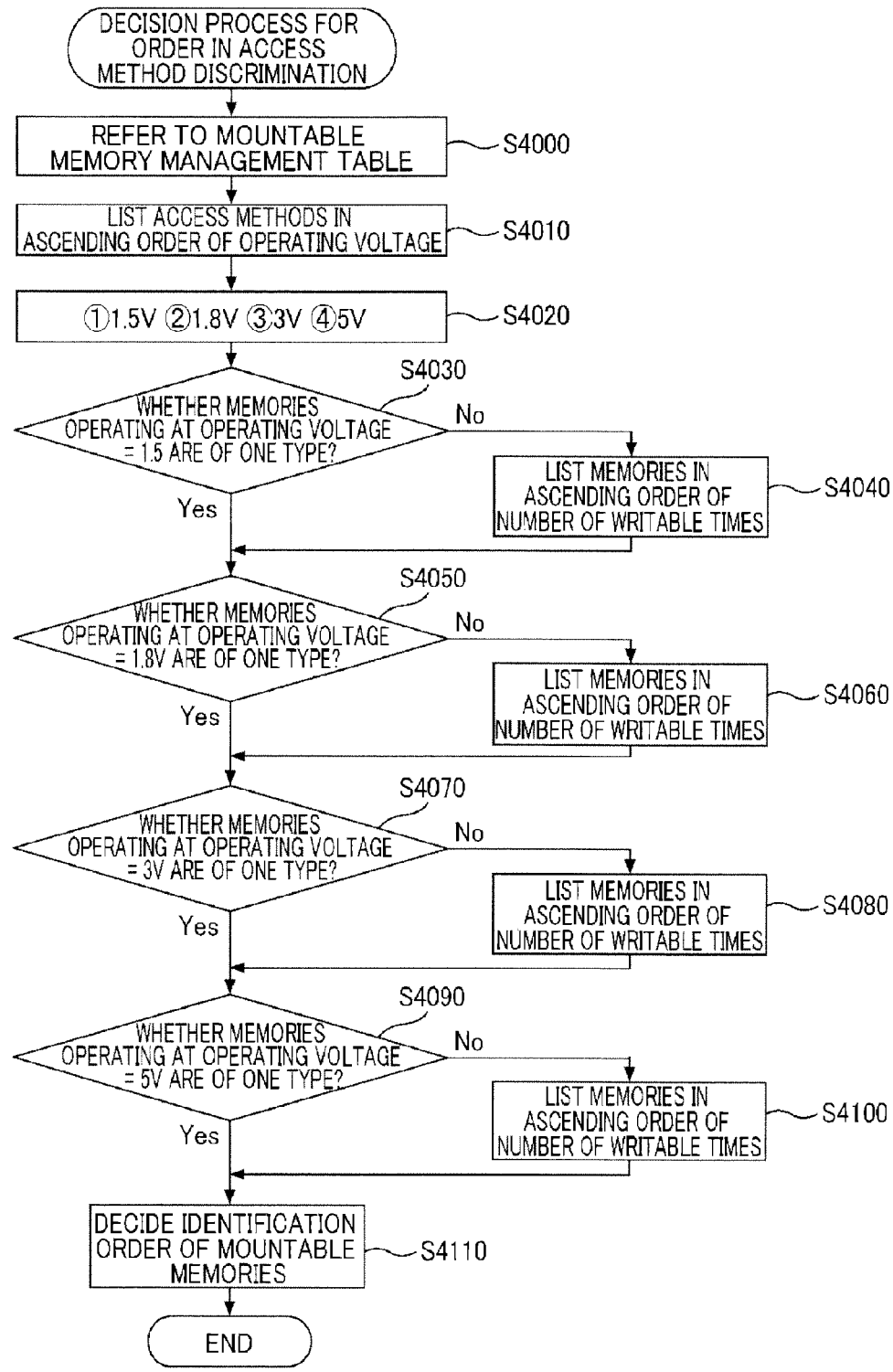
FIG. 21 is a flowchart showing a flow of a decision process for determining the order in which access method discrimination process is to be carried out according to the present embodiment.

The storage apparatus 300 first refers to the mountable memory management table 450 (S4000) as shown in the flowchart of FIG. 21. Then, the storage apparatus 300 sorts the access methods (interfaces) listed in the mountable memory management table 450 in the ascending order of operating voltage (S4010, S4020).

Then, the storage apparatus 300 determines whether or not memories operating at an operating voltage of 1.5V are of one type (S4030). If there are a plurality of types of the memories operating at an operating voltage of 1.5V, the process proceeds to "No," and sorts memories operating at an operating voltage of 1.5V in the ascending order of the number of writable times (S4040).

Then, the storage apparatus 300 determines whether or not memories operating at an operating voltage of 1.8V are of one type (S4050). If there are plurality of types of the memories operating at an operating voltage of 1.8V, the process proceeds to "No," and sorts memories operating at an operating voltage of 1.8V in the ascending order of the number of writable times (S4060).

Then, the storage apparatus 300 determines whether or not memories operating at an operating voltage of 3V are of one type (S4070). If there are plurality of types of the memories operating at an operating voltage of 3V, the process proceeds to "No," and sorts memories operating at an operating voltage of 3V in the ascending order of the number of writable times (S4080).

Then, the storage apparatus 300 determines whether or not memories operating at an operating voltage of 5V are of one type (S4090). If there are plurality of types of the memories operating at an operating voltage of 5V, the process proceeds to "No," and sorts memories operating at an operating voltage of 5V in the ascending order of the number of writable times (S4100).

Then, the storage apparatus 300 decides to perform the access method discrimination process for the storage drive 350 mounted in the mounting slot 351 in the orders sorted as described above.

Thus, the access method discrimination process for the mounted storage drive 350 can be performed in the ascending order of the operating voltage from a voltage equal to or lower than the rated operating voltage of the storage drive 350. This allows preventing the storage drive 350 from being destroyed due to the application of a voltage higher than maximum allowable voltage of the storage drive 350 to the storage drive 350. In this way, even if storage drives 350 including interfaces operating at a variety of operating voltages are mounted on the storage apparatus 300 together, access methods for such storage drives 350 can be identified safely.

According to the access method discrimination order decision process described above, the access method for a storage drive 350 of a lower number of writable times can be discriminated in the earliest possible phase, whereby increase of an accumulated value of the number of times of write to the storage drive 350 can be suppressed.

Access Method Discrimination Process

In the access method discrimination process, the access method discrimination process is executed for all of the storage drives 350 subjected to the access method discrimination in the order decided in the access method discrimination order decision process described above.

Figure 22:
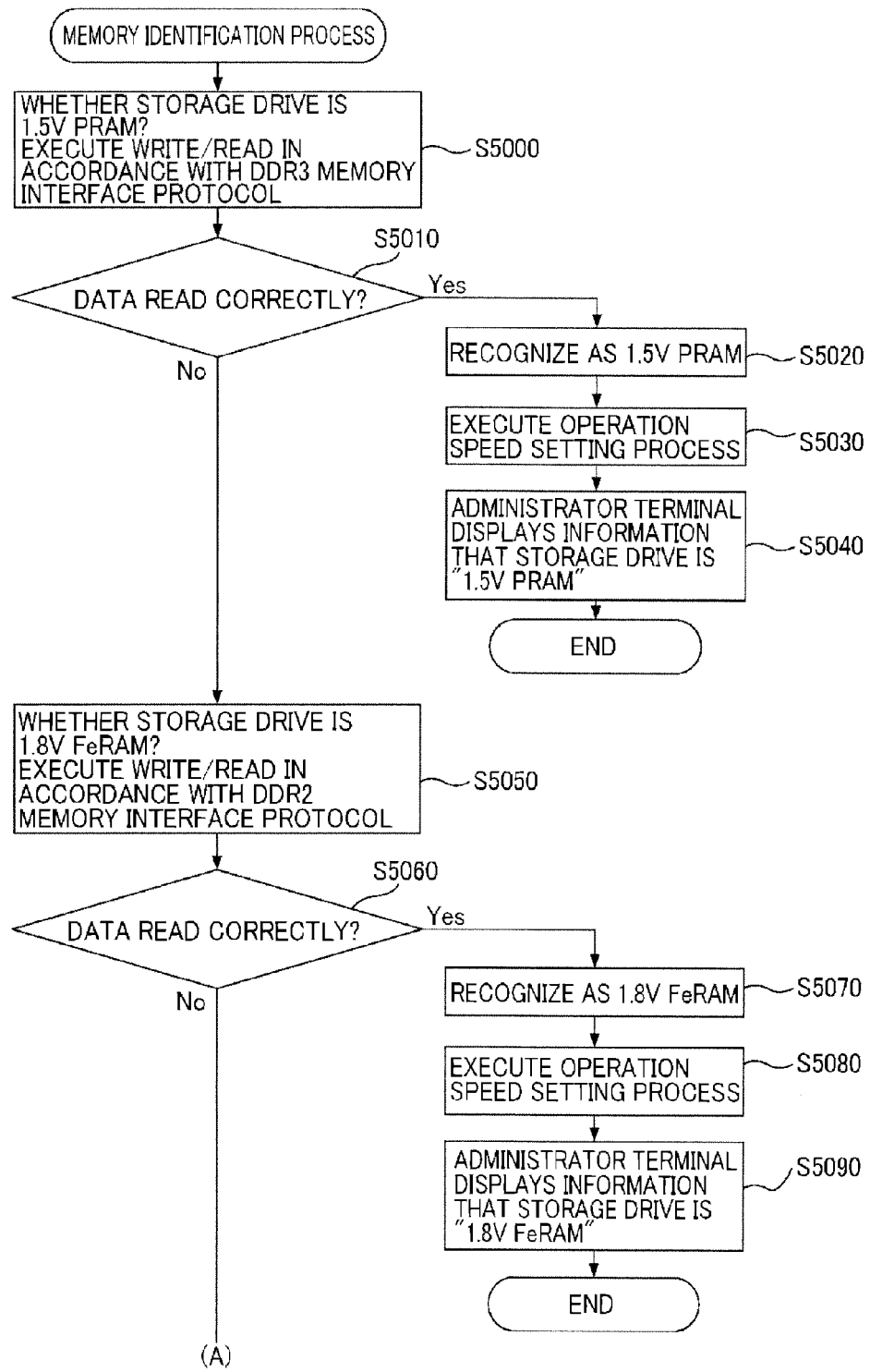
FIG. 22 is a flowchart showing a flow of a memory identification process according to the present embodiment.
Figure 23:
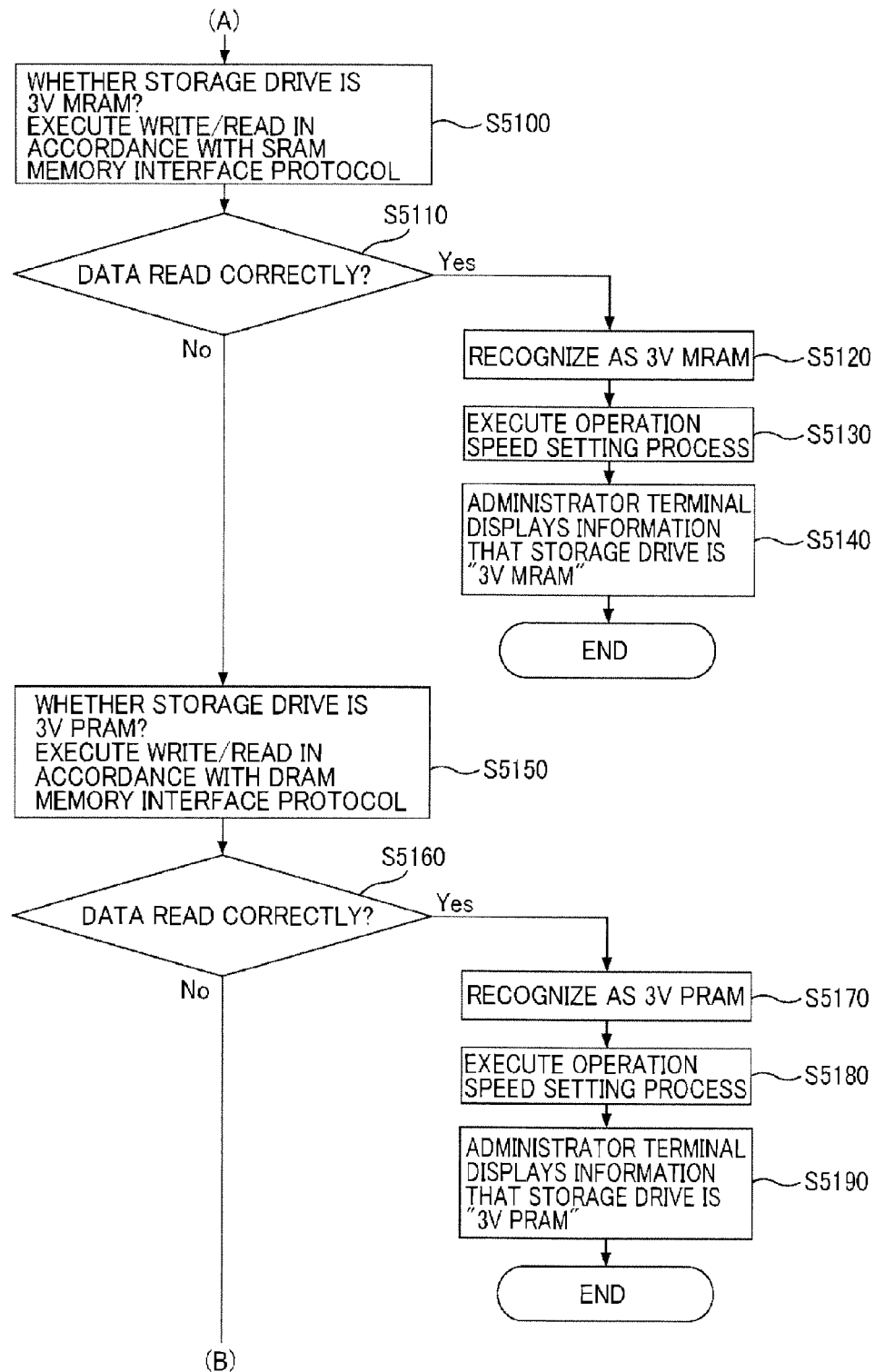
FIG. 23 is a flowchart showing a flow of a memory identification process according to the present embodiment.
Figure 24:
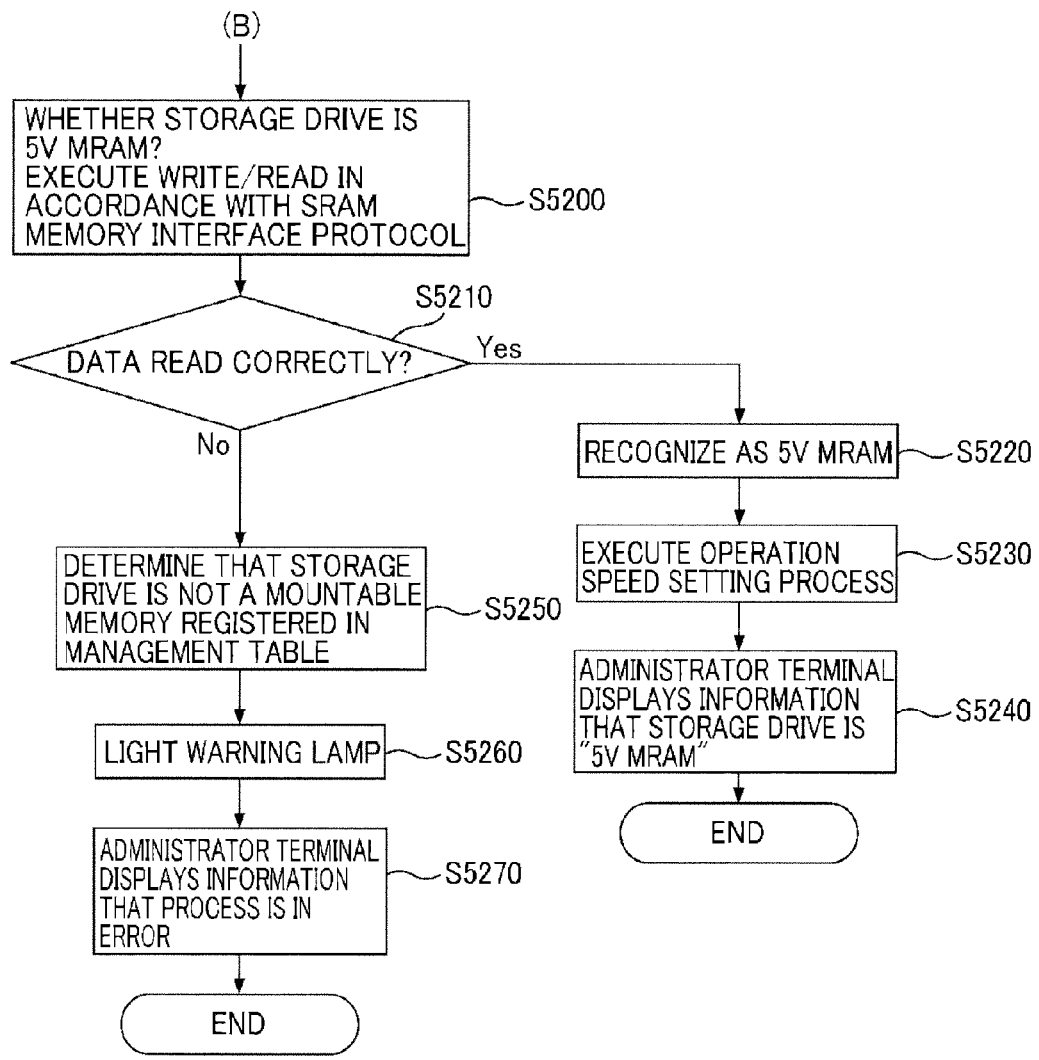
FIG. 24 is a flowchart showing a flow of a memory identification process according to the present embodiment.

As shown in the flowcharts of FIG. 22 to FIG. 24, the storage apparatus 300 first determines whether or not a storage drive 350 subjected to the discrimination is a PRAM operating at an operating voltage of 1.5V. To this end, the storage apparatus 300 executes data write and read to and from the storage drive 350 subjected to the discrimination in accordance with the DDR3 interface (S5000). The interface for writing and reading data to and from the storage drive 350 to determine whether or not the storage drive 350 is a PRAM of 1.5V is stated in the access method definition information 767.

The storage apparatus 300 determines whether or not data was read correctly from the storage drive 350 (S5010). If data was read correctly, the storage apparatus 300 determines that the storage drive 350 is a PRAM drive of 1.5V (S5020). Then, the storage apparatus 300 writes information listed in the mountable memory management table 450 into the "Drive type" column, the "Operating voltage" column, the "Number of writable times" column, the "Interface" column, and the "Access time" column of the storage drive 350 in the drive management table 400.

Figure 25:
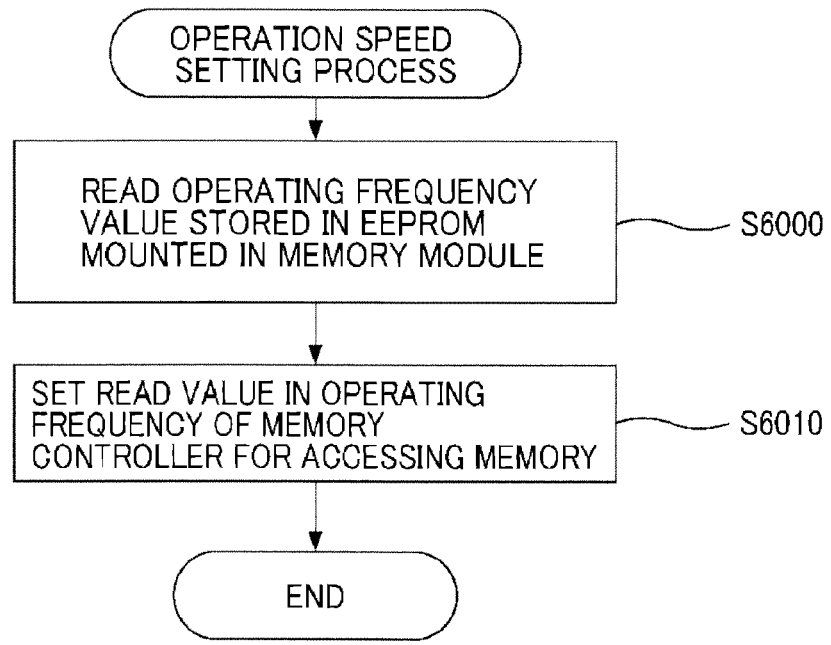
FIG. 25 is a flowchart showing a flow of an operation speed setting process according to the present embodiment.

Then, the storage apparatus 300 executes an operating speed setting process for the storage drive 350 (S5030). FIG. 25 shows the flow of the operating speed setting process.

The storage apparatus 300 first reads out, from the storage drive 350, a value of the operating frequency stored in nonvolatile memories such as EEPROMs (Electronically Erasable and Programmable Read Only Memory) mounted in the storage drive 350 (S6000). Then, the storage apparatus 300 sets so that access to the storage drive 350 may be made at the operating frequency thus read out (S6010).

Figure 26:
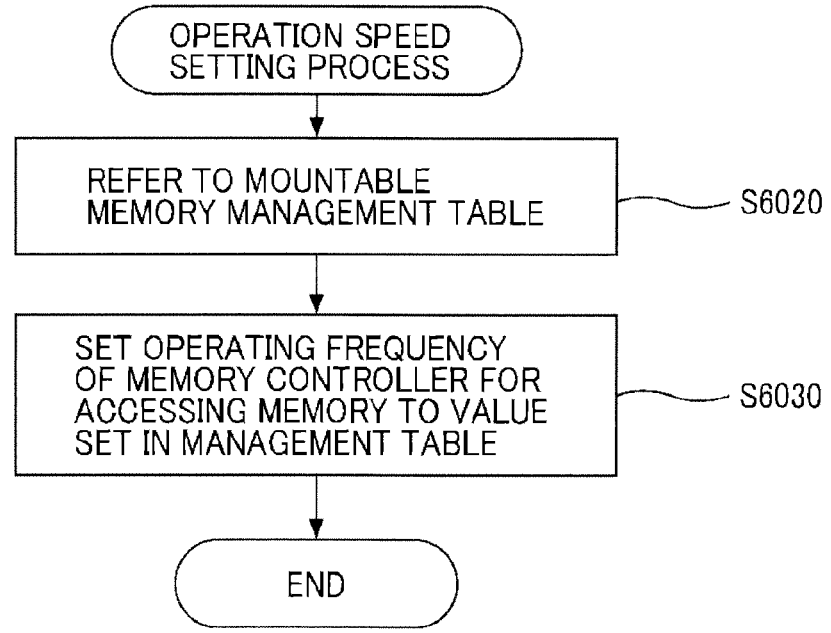
FIG. 26 is a flowchart showing a flow of the operation speed setting process according to the present embodiment.

Alternatively, when the operating frequency is listed in the mountable memory management table 450 in association with each of the access methods, the operating speed setting process may be executed as shown in FIG. 26.

In this case, the storage apparatus 300 first reads a value of the operating frequency with reference to the mountable memory management table 450 (S6020). Then, the storage apparatus 300 sets so that access to the storage drive 350 may be made at the operating frequency thus read out (S6030).

Next, returning to FIG. 22, the storage apparatus 300 sends, to the administrator terminal 200, a message that the storage drive 350 subjected to the access method discrimination in the above process is a PRAM drive of 1.5V, and the administrator terminal 200 displays the same effect on the output device 260 (S5040).

On the other hand, if data could not be read correctly from the storage drive 350 in S5010, the storage apparatus 300 determines whether or not the storage drive 350 subjected to the discrimination is a FeRAM operating at an operating voltage of 1.8V. For this purpose, the storage apparatus 300 executes data write and read to and from the storage drive 350 subjected to the discrimination in accordance with the DDR2 interface (S5050). The interface for writing and reading data to and from the storage drive 350 to determine whether or not the storage drive 350 is a FeRAM of 1.8V is stated in the access method definition information 767.

The storage apparatus 300 determines whether or not data was read correctly from the storage drive 350 (S5060). If data was read correctly, the storage apparatus 300 determines that the storage drive 350 is a FeRAM drive of 1.8V (S5070).

Then, the storage apparatus 300 writes information listed in the mountable memory management table 450 into the "Drive type" column, the "Operating voltage" column, the "Number of writable times" column, the "Interface" column, and the "Access time" column of the storage drive 350 in the drive management table 400.

Then, the storage apparatus 300 executes the operation speed setting process for the storage drive 350 (S5080). The operation speed setting process is executed similarly as described above with reference to FIG. 25 and FIG. 26.

Then, the storage apparatus 300 sends, to the administrator terminal 200, a message that the storage drive 350 subjected to the access method discrimination in the above process is a FeRAM drive of 1.8V, and the administrator terminal 200 displays the same effect on the output device 260 (S5090).

If data could not be read correctly from the storage drive 350 in S5060, the storage apparatus 300 determines whether or not the storage drive 350 subjected to the discrimination is a MRAM operating at an operating voltage of 3V. For this purpose, the storage apparatus 300 executes data write and read to and from the storage drive 350 subjected to the discrimination in accordance with the SRAM interface (S5100). The interface for writing and reading data to and from the storage drive 350 to determine whether or not the storage drive 350 is a MRAM of 3V is listed in the access method definition information 767.

The storage apparatus 300 determines whether or not data was read correctly from the storage drive 350 (S5110). If data was read correctly, the storage apparatus 300 determines that the storage drive 350 is a MRAM drive of 3V (S5120). Then, the storage apparatus 300 writes information listed in the mountable memory management table 450 into the "Drive type" column, the "Operating voltage" column, the "Number of writable times" column, the "Interface" column, and the "Access time" column of the storage drive 350 in the drive management table 400.

Then, the storage apparatus 300 executes the operation speed setting process for the storage drive 350 (S5130). The operation speed setting process is executed similarly as described above with reference to FIG. 25 and FIG. 26.

Then, the storage apparatus 300 sends, to the administrator terminal 200, a message that the storage drive 350 subjected to the access method discrimination in the above process is a MRAM drive of 3V, and the administrator terminal 200 displays the same effect on the output device 260 (S5140).

If data could not be read correctly from the storage drive 350 in S5110, the storage apparatus 300 determines whether or not the storage drive 350 subjected to the discrimination is a PRAM operating at an operating voltage of 3V. For this purpose, the storage apparatus 300 executes data write and read to and from the storage drive 350 subjected to the discrimination in accordance with the DRAM interface (S5150). The interface for writing and reading data to and from the storage drive 350 to determine whether or not the storage drive 350 is a PRAM of 3V is listed in the access method definition information 767.

The storage apparatus 300 determines whether or not data was read correctly from the storage drive 350 (S5160). If data was read correctly, the storage apparatus 300 determines that the storage drive 350 is a PRAM drive of 3V (S5170). Then, the storage apparatus 300 writes information stated in the mountable memory management table 450 into the "Drive type" column, the "Operating voltage" column, the "Number of writable times" column, the "Interface" column, and the "Access time" column of the storage drive 350 in the drive management table 400.

Then, the storage apparatus 300 executes the operation speed setting process for the storage drive 350 (S5180). The operation speed setting process is executed similarly as described above with reference to FIG. 25 and FIG. 26.

Then, the storage apparatus 300 sends, to the administrator terminal 200, a message that the storage drive 350 subjected to the access method discrimination in the above process is a PRAM drive of 3V, and the administrator terminal 200 displays the same effect on the output device 260 (S5190).

If data could not be read correctly from the storage drive 350 in S5160, the storage apparatus 300 determines whether or not the storage drive 350 subjected to the discrimination is a MRAM operating at an operating voltage of 5V. For this purpose, the storage apparatus 300 executes data write and read to and from the storage drive 350 subjected to the discrimination in accordance with the SRAM interface (S5200). The interface for writing and reading data to and from the storage drive 350 to determine whether or not the storage drive 350 is a MRAM of 5V is listed in the access method definition information 767.

The storage apparatus 300 determines whether or not data was read correctly from the storage drive 350 (S5210). If data was read correctly, the storage apparatus 300 determines that the storage drive 350 is a MRAM drive of 5V (S5220). Then, the storage apparatus 300 writes information stated in the mountable memory management table 450 into the "Drive type" column, the "Operating voltage" column, the "Number of writable times" column, the "Interface" column, and the "Access time" column of the storage drive 350 in the drive management table 400.

Then, the storage apparatus 300 executes the operation speed setting process for the storage drive 350 (S5230). The operation speed setting process is executed similarly as described above with reference to FIG. 25 and FIG. 26.

Then, the storage apparatus 300 sends, to the administrator terminal 200, a message that the storage drive 350 subjected to the access method discrimination in the above process is a MRAM drive of 5V, and the administrator terminal 200 displays the same effect on the output device 260 (S5240).

If data could not be read correctly from the storage drive 350 in S5210, the storage apparatus 300 determines that the storage drive 350 subjected to the discrimination is not a storage drive 350 of any type registered in the mountable memory management table 450 (S5250).

Then, the storage apparatus 300 sends, to the administrator terminal 200, information that the access method could not be discriminated, and the administrator terminal 200 displays, for example, a warning lamp on the output device 260 (S5260). Also, the administrator terminal 200 displays information to the same effect on the output device 260 (S5270). Also, in order to allow an easy identification of the location of the mounting slot 351 in which to mount the storage drive 350 determined as not being a storage drive 350 of any type, the storage apparatus 300 turns on a LED (Light Emitting Diode) (not shown) included in the corresponding mounting slot 351.

The storage apparatus 300 executes the above process for all of the storage drives 350 subjected to the discrimination. With the above process, the storage apparatus 300 is capable of executing the access method discrimination process for each storage drive 350 coupled thereto in the ascending order of the operating voltage. This allows preventing the storage drive 350 from being destroyed due to the application of a voltage higher than the operating voltage supported by the storage drive 350 to the storage drive 350.

Other Examples of Access Method Discrimination Process

Figure 27:
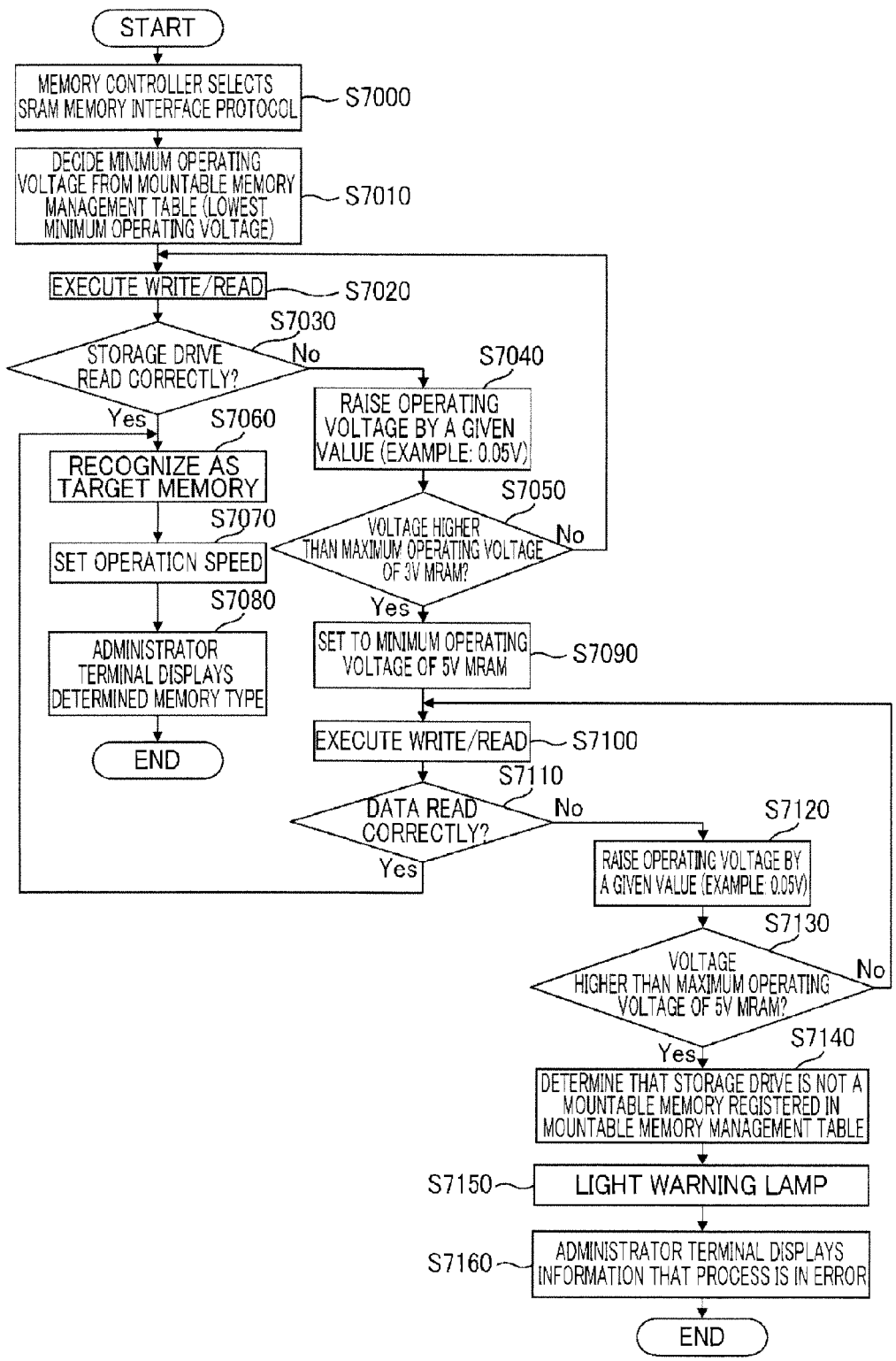
FIG. 27 is a flowchart showing a flow of the memory identification process according to the present embodiment.

If access to the storage drive 350 coupled to the storage apparatus 300 is made by a specific access method, the above access method discrimination process may be executed in accordance with a procedure illustrated in a flowchart shown in FIG. 27. The flowchart shown in FIG. 27 is an example of a case where the access method of the storage drive 350 is SRAM.

In this case, the storage apparatus 300 first selects SRAM as the access method (S7000). Then, the storage apparatus 300 decides a minimum operating voltage with reference to the mountable memory management table 450 and the access method definition information 767 (S7010). Specifically, since the mountable memory management table 450 according to the present embodiment lists SRAM operating at an operating voltage of 5V and SRAM operating at an operating voltage of 3V, the storage apparatus 300 decides 3V as the minimum operating voltage.

Next, the storage apparatus 300 executes data write and data read on the assumption that the access method of the storage drive 350 subjected to the access method discrimination is of SRAM of 3V (S7020). Then, the storage apparatus 300 determines whether or not data was read correctly from the storage drive 350 (S7030).

If data was read out correctly, the storage apparatus 300 determines that the storage drive 350 is MRAM of 3V (S7060). Then, the storage apparatus 300 writes information listed in the mountable memory management table 450 into the "Drive type" column, the "Operating voltage" column, the "Number of writable times" column, the "Interface" column, and the "Access time" column of the storage drive 350 in the drive management table 400.

Then, the storage apparatus 300 executes the operation speed setting process of the storage drive 350 (S7070). The operation speed setting process is executed similarly as described above with reference to FIG. 25 and FIG. 26.

Then, the storage apparatus 300 sends, to the administrator terminal 200, a message that the storage drive 350 subjected to the access method discrimination in the above process is a MRAM drive of 3V, and the administrator terminal 200 displays the same effect on the output device 260 (S7080).

On the other hand, if data could not be read correctly in S7030, the storage apparatus 300 raises the operating voltage by a given value (for example, 0.05V) (S7040). Specifically, the signal translation controller 764 raises the operating voltage by controlling the operating voltage output unit 765. Then, the storage apparatus 300 again executes data write and data read to and from the storage drive 350 at the new operating voltage raised by the given value (S7020). Here, an increment of the operating voltage can be modified by the setting at the administrator terminal 200, for example. This allows to flexibly perform an operating voltage identification process for the storage drive 350. Alternatively, an increment thereof may be a fixed value.

If data write and read to and from the storage drive 350 was made correctly at an operating voltage equal to or higher than 3V and if the operating voltage is lower than a maximum operating voltage of MRAM of 3V, the storage apparatus 300 may determine that the storage drive 350 is a MRAM drive of 3V and access to the storage drive 350 may be made at a rated voltage of 3V. Alternatively, access to the storage drive 350 may be made at the operating voltage at which data can be read and written correctly.

On the other hand, if the new operating voltage raised by a given value in S7050 is higher than a maximum operating voltage of the MRAM drive of 3V, the storage apparatus 300 executes data write and data read on the assumption that the access method of the storage drive 350 subjected to the access method discrimination is of SRAM of 5V (S7090, S7100).

Then, the storage apparatus 300 determines whether or not data was correctly read from the storage drive 350 (S7110).

If data was read correctly, the storage apparatus 300 determines that the storage drive 350 is a MRAM drive of 5V (S7060). Then, the storage apparatus 300 writes information listed in the mountable memory management table 450 into the "Drive type" column, the "Operating voltage" column, the "Number of writable times" column, the "Interface" column, and the "Access time" column of the storage drive 350 in the drive management table 400. Note that, this may be performed when data write and data read to and from the storage drive 350 was done correctly at the operating voltage equal to or lower than 5V.

Next, the storage apparatus 300 executes the operation speed setting process of the storage drive 350 (S7070). The operation speed setting process is executed similarly as described above with reference to FIG. 25 and FIG. 26.

Then, the storage apparatus 300 sends, to the administrator terminal 200, a message that the storage drive 350 subjected to the access method discrimination in the above process is a MRAM drive of 5V, and the administrator terminal 200 displays the same effect on the output device 260 (S7080).

On the other hand, if data could not be read correctly in S7110, the storage apparatus 300 raises the operating voltage by a given value (for example, 0.05V) (S7120). Then, the storage apparatus 300 again executes data write and read to and from the storage drive 350 at the new operating voltage raised by the given value (S7100). Here, an increment of the operating voltage can be modified by the setting at the administrator terminal 200, for example. This allows to flexibly perform an operating voltage identification process for the storage drive 350. Alternatively, an increment thereof may be a fixed value.

If data write and read to and from the storage drive 350 was made correctly at an operating voltage equal to or lower than 5V and if the operating voltage is lower than a maximum operating voltage of MRAM of 5V, the storage apparatus 300 may determine that the storage drive 350 is a MRAM drive of 5V and access to the storage drive 350 may be made at a rated voltage of 5V. Alternatively, access to the storage drive 350 may be made at the operating voltage at which data can be read and written correctly.

If the new operating voltage raised by a given value in S7130 is higher than a maximum operating voltage of the MRAM drive of 5V, the storage apparatus 300 determines that the storage drive 350 subjected to the discrimination is not a storage drive 350 of any type registered in the mountable memory management table 450 (S7140).

Then, the storage apparatus 300 sends, to the administrator terminal 200, information that the access method could not be discriminated, and the administrator terminal 200 displays, for example, a warning lamp on the output device 260 (S7150). Also, the administrator terminal 200 displays information to the same effect on the output device 260 (S7160). Also, in order to allow easy identification of the location of the mounting slot 351 in which to mount the storage drive 350 determined as not being a storage drive 350 of any type, the storage system 300 turns on a LED (not shown) included in the corresponding mounting slot 351.

The storage apparatus 300 executes the above process for all storage drives 350 subjected to the discrimination.

As described above, a voltage allowing data write and data read to and from the storage drive 350 is identified by raising a drive voltage applied to the storage drive 350 mounted in the mounting slot 351 starting from a voltage equal to or lower than the rated drive voltage of the storage drive 350. Thus, the storage apparatus 300 can perform the access method discrimination process for the storage drive 350 coupled thereto in the ascending order of the operating voltage. This allows preventing the storage drive 350 from being destroyed due to the application of a voltage, higher than the operating voltage supported by the storage drive 350, to the storage drive 350.

<Process of Allocating Logical Volume to Host Apparatus>

In the storage apparatus 300 according to the present embodiment, the RAID group 340 is configured using a storage drive 350 whose operating voltage is identified as described above, and a logical volume is configured on the RAID group 340.

As described above, for each of the storage drives 350, the number of writable times is set according to the type of a nonvolatile memory mounted on the storage drive 350. Thus, the number of times of data write from the host apparatus 100 to a logical volume is limited according to the type of the storage drive 350 configuring the logical volume.

Therefore, the storage apparatus 300 according to the present embodiment controls so that a logical volume to which an appropriate allowed number of times of data write is set may be allocated to the host apparatus 100 according to the data access frequency of the host apparatus 100.

Specifically, for example, the storage apparatus 300 acquires the access frequency of each of the virtual volumes 391 provided to the host apparatus 100, and preferentially allocates a normal volume 390 allowing a larger number of times of data write to a virtual volume having higher access frequency. Further, the storage apparatus 300 may acquire the access frequency of each of the virtual volumes 391 provided to the host apparatus 100, and preferentially allocate a normal volume 390 allowing a smaller number of times of data write to a virtual volume having lower access frequency.

This enables efficient utilization of storage resources provided by the storage drive 350.

Figure 28:
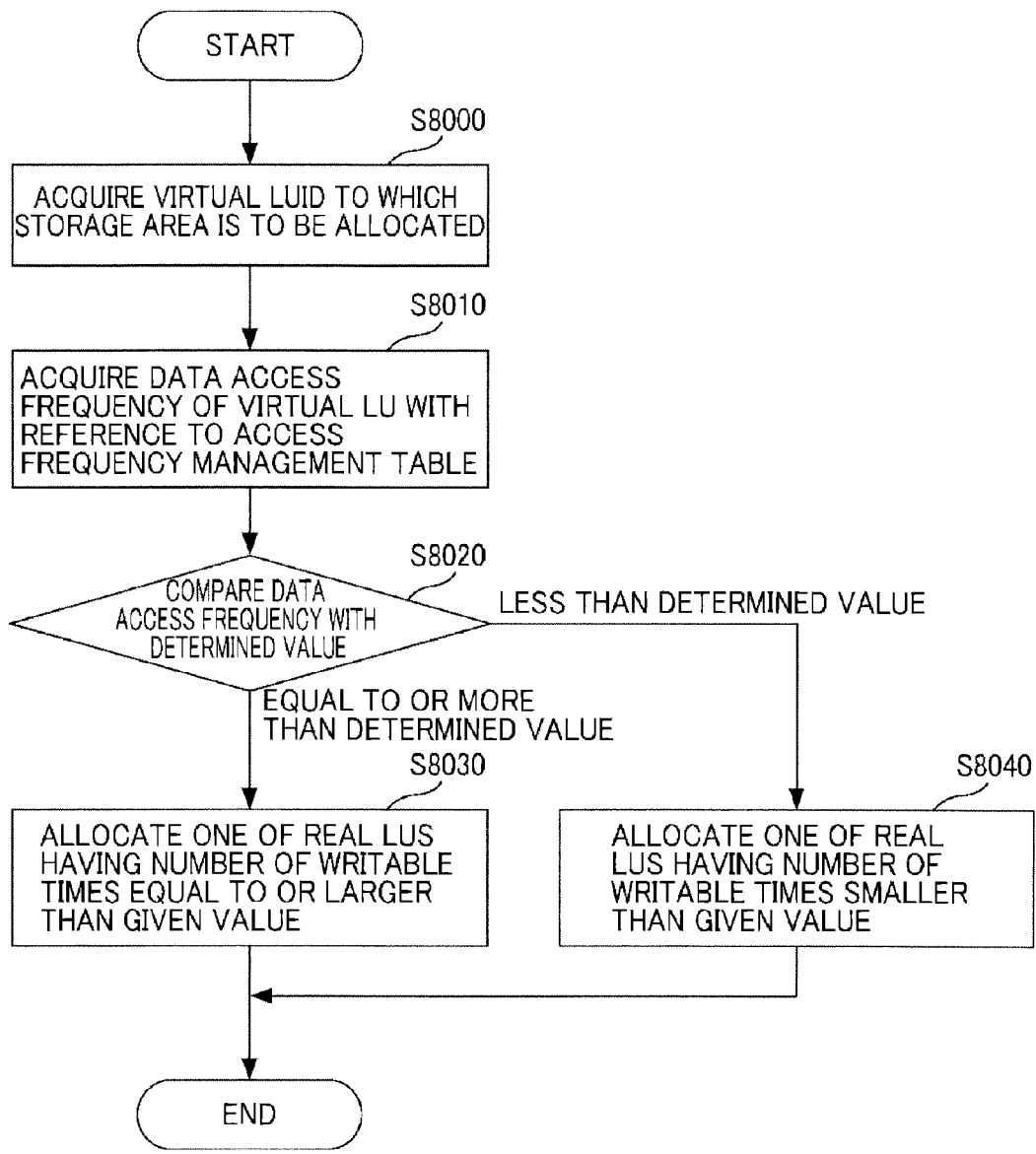
FIG. 28 is a flow chart showing a flow of a storage area allocation process to the host apparatus according to the present embodiment.

Process flow will be described with reference to a flowchart shown in FIG. 28.

First, the storage apparatus 300 acquires identification information of a virtual volume 391 to which a storage area is to be allocated (S8000). For example, when a storage volume exceeding a given percentage (for example, 80% or more) is already used out of the total storage capacity of the normal volume 390 already allocated to the virtual volume 391, the storage apparatus 300 allocates a new normal volume 390 to the virtual volume 391.

Next, the storage apparatus 300 acquires the data access frequency of the virtual volume 391 with reference to the access frequency management table 440 (S8010).

Then, the storage apparatus 300 compares the access frequency with a determined value (S8020). If the access frequency is higher than the determined value, the storage apparatus 300 determines that the access frequency to the virtual volume 391 is high, and allocates a normal volume 390 allowing a larger number of times of data write than a given value to the virtual volume 391 with reference to the LU management table 420 and the RAID group management table 410 (S8030).

When a new storage area is allocated to a plurality of virtual volumes 391, the storage apparatus 300 may allocate a normal volume 390 allowing a larger number of times of data write to a virtual volume having higher access frequency, according to the access frequency of each of the virtual volumes 391.

On the other hand, if the access frequency is lower than the determined value as a result of the comparison of the access frequency of the virtual volume 391 with the determined value (S8020), the storage apparatus 300 determines that the access frequency to the virtual volume 391 is low and then allocates a normal volume 390 allowing a smaller number of times of data write than a given value to the virtual volume 391 with reference to the LU management table 420 and the RAID group management table 410 (S8040).

Such process allows the allocation of a logical volume 390 to which an appropriate allowed number of times of data write is set to the virtual volume 391 according to the data access frequency to the virtual volume 391.

A preferred embodiment of the present invention has been described above for illustrating the present invention only and not intended to limit the scope of the present invention to the embodiment. The present invention can be implemented in a variety of other configurations.

The invention claimed is:

1. A storage apparatus comprising:
an I/O controller configured to receive an access request sent from an information apparatus communicatively coupled thereto and write data to or read data from a storage drive in response to the access request;
a storage drive mounting unit, in which the storage drive is detachably mounted, capable of mounting therein a plurality of types of the storage drives with a same drive voltage and accessible in accordance with different access methods and allowing different numbers of times of data write;
a drive power supplying unit configured to supply drive power to the storage drive mounted in the storage drive mounting unit; and
a drive voltage identifying unit configured to be capable of identifying a voltage allowing data write to or data read from the storage drive by
raising a drive voltage applied to the storage drive mounted in the storage drive mounting unit from a voltage not higher than a rated drive voltage of the storage drive;
checking whether data is writable to or readable from the storage drive in accordance with an access method of the storage drive; and
checking whether data is writable to or readable from the storage drive while applying the access methods of the storage drives in ascending order of the allowed number of times of data write, wherein
when the I/O controller writes data to or reads data from the storage drive, the drive power supplying unit is configured to apply the identified voltage to the storage drive to drive the storage drive.

2. The storage apparatus according to claim 1, wherein
the storage system further comprising a virtual volume manager configured to provide the information apparatus with a virtual volume implemented by being assigned a storage area of a logical volume configured using a storage area of the storage drive;
the virtual volume manager configured to allocate the logical volume configured using the storage drive that allows a larger number of times of data write, preferentially to the virtual volume having high access frequency from the information apparatus;
the storage area of the logical volume is configured using a storage area of a RAID group configured using the storage drive;
the storage drive mounting unit is capable of mounting a plurality of types of the storage drives having different access methods;
the RAID group is configured using the storage drives accessed by a common method;

the storage drive mounting unit is capable of mounting a plurality of types of the storage drives allowing different numbers of times of data write;

the RAID group is configured using the storage drives allowing a same number of times of data write; and the drive voltage identifying unit identifies the voltage for the storage drive in response to at least any one of a mounting of the storage drive in the storage drive mounting unit and a starting of the storage apparatus.

3. The storage apparatus according to claim 1, further comprising a virtual volume manager configured to provide the information apparatus with a virtual volume implemented by being assigned a storage area of a logical volume configured using a storage area of the storage drive, wherein the virtual volume manager is configured to allocate the logical volume configured using the storage drive that allows a larger number of times of data write, preferentially to the virtual volume having high access frequency from the information apparatus.

4. The storage apparatus according to claim 3, wherein the storage area of the logical volume is configured using a storage area of a RAID group configured using the storage drive.

5. The storage apparatus according to claim 4, wherein the storage drive mounting unit is capable of mounting a plurality of types of the storage drives having different access methods, and the RAID group is configured using the storage drives accessed by a common method.

6. The storage apparatus according to claim 4, wherein the storage drive mounting unit is capable of mounting a plurality of types of the storage drives allowing different numbers of times of data write, and the RAID group is configured using the storage drives allowing a same number of number of times of data write.

7. The storage apparatus according to claim 1, wherein the drive voltage identifying unit is configured to identify the voltage for the storage drive in response to at least any one of a mounting of the storage drive in the storage drive mounting unit and a starting of the storage apparatus.

8. A method for controlling a storage apparatus comprising:

an I/O controller configured to receive an access request sent from an information apparatus communicatively coupled thereto and write data to or read data from a storage drive in response to the access request;

a storage drive mounting unit, in which the storage drive is detachably mounted, capable of mounting therein a plurality of types of the storage drives with a same drive voltage and accessible in accordance with different access methods and allowing different numbers of times of data write; and a drive power supplying unit configured to supply drive power to the storage drive mounted in the storage drive mounting unit, the method comprising causing the storage apparatus to identify a voltage allowing data write to or data read from the storage drive by raising a drive voltage applied to the storage drive mounted in the storage drive mounting unit from a voltage not higher than a rated drive voltage of the storage drive, checking whether data is writable to or readable from the storage drive in accordance with an access method of the storage drive, or checking whether data is writable to or readable from the storage drive while applying the access methods of the storage drives in ascending order of the allowed number of times of data write, and when the I/O controller writes data to or reads data from the storage drive, causing the drive power supplying unit to apply the identified voltage to the storage drive to drive the storage drive.

\* \* \* \* \*